(12) United States Patent
Colliander

(10) Patent No.: US 9,805,614 B2
(45) Date of Patent: Oct. 31, 2017

(54) SYSTEM AND METHOD FOR ENABLING CROWD-SOURCED EXAMINATION MARKING

(71) Applicant: James Colliander, Toronto (CA)

(72) Inventor: James Colliander, Toronto (CA)

(73) Assignee: CROWDMARK INC., Toronto, ON (CA)

( * ) Notice: Subject to any disclaimer, the term of this patent is extended or adjusted under 35 U.S.C. 154(b) by 0 days.

(21) Appl. No.: 14/122,511

(22) PCT Filed: Sep. 17, 2013

(86) PCT No.: PCT/CA2013/000789
§ 371 (c)(1),
(2) Date: Nov. 26, 2013

(87) PCT Pub. No.: WO2014/040179
PCT Pub. Date: Mar. 20, 2014

(65) Prior Publication Data
US 2015/0161903 A1    Jun. 11, 2015

Related U.S. Application Data

(60) Provisional application No. 61/701,865, filed on Sep. 17, 2012.

(51) Int. Cl.
| | |
|---|---|
| *G09B 7/02* | (2006.01) |
| *G06Q 50/20* | (2012.01) |
| *G06Q 10/06* | (2012.01) |
| *G06Q 10/10* | (2012.01) |
| *G09B 7/06* | (2006.01) |

(52) U.S. Cl.
CPC ............ *G09B 7/02* (2013.01); *G06Q 10/0633* (2013.01); *G06Q 10/103* (2013.01); *G06Q 50/20* (2013.01); *G09B 7/06* (2013.01)

(58) Field of Classification Search
CPC .................................. G09B 7/02; G06Q 50/20
USPC ........................................................ 434/350
See application file for complete search history.

(56) References Cited

U.S. PATENT DOCUMENTS

| | | |
|---|---|---|
| 5,991,595 A | 11/1999 | Romano et al. |
| 2005/0086257 A1 | 4/2005 | Wright et al. |

(Continued)

OTHER PUBLICATIONS

WIPO, International Search Report and Written Opinion for PCT Application No. PCT/CA2013/000789 dated Nov. 22, 2013.

*Primary Examiner* — Thomas Hong
(74) *Attorney, Agent, or Firm* — Norton Rose Fulbright Canada LLP; Niall Cooney

(57) ABSTRACT

A computer network implemented system for enabling intelligent crowd sourced examination marking is provided. The system provides features for building and managing a crowd of markers, and a profile manager for managing profiles for each marker. The system enables authorized users to generate marking parameters associated with marking projects. A matching component for matching marking projects or marking activities to crowd markers suggests suitable crowd markers for the marking project. The system delivers applicable examination content for marking (including scoring and/or providing feedback on examination content) by selected crowd markers, or groups of crowd markers through an adaptive marking tool.

17 Claims, 9 Drawing Sheets

(56) References Cited

U.S. PATENT DOCUMENTS

| | | | |
|---|---|---|---|
| 2007/0105084 A1* | 5/2007 | Kuntz | G09B 7/02 434/350 |
| 2007/0218450 A1* | 9/2007 | MacClay | G09B 7/00 434/353 |
| 2009/0226872 A1* | 9/2009 | Gunther | G09B 7/00 434/350 |
| 2009/0311658 A1* | 12/2009 | Polivka | G09B 5/00 434/350 |
| 2011/0269110 A1* | 11/2011 | McClellan | G06Q 10/06 434/353 |
| 2012/0231440 A1 | 9/2012 | McBride et al. | |

* cited by examiner

SYSTEM AND METHOD FOR ENABLING CROWD-SOURCED EXAMINATION MARKING

PRIORITY

This application claims all benefit, including priority, of U.S. Provisional Patent Application Ser. No. 61/701,865, filed Sep. 17, 2012 entitled SYSTEM AND METHOD FOR ENABLING CROWD-SOURCED EXAMINATION MARKING.

FIELD

The present invention relates to solutions for systematizing the review of artefacts (such as documents, videos, or images) by a team of skilled humans. The present invention also relates to managed crowd sourcing platforms.

INTRODUCTION

There are many contexts where the review or evaluations of a large number of artefacts is required, and this requires a plurality of reviewers or evaluators. Organizing, managing and systematizing their work is complicated and time consuming.

For example, many educational programs use examinations to assess the learning of students. There are different forms of examinations. Many include questions where students are required to provide answers in written form, as opposed to for example merely selecting one of multiple answers to multiple choice questions. Marking written answers correctly, and in a fair and consistent manner, generally requires investment of significant resources.

What follows is an explanation of a typical, prior examination marking process. One or more teachers set an exam and may create a "marking scheme" that usually contains a list of questions and optionally sub-questions, and the marks assigned to such questions and sub-questions. The teachers may also prepare a "marking guide" which may also include sample answers and marking notes and suggestions.

Marking is usually completed by a group of markers. For example for an undergraduate examination, a group of graduate students may be used. The teachers generally meet with the group of markers to discuss the exam, and various aspects involved in marking the exam correctly, and in a fair and consistent manner. There is usually a detailed discussion of the marking scheme and the marking guide.

A significant issue is ensuring that examination takers are given feedback regarding their answers that adds to their learning. It is also desirable that the feedback given be of a consistently high quality.

Examination papers are generally distributed amongst the group of markers for marking in a number of different ways. Specific groups of papers may be assigned to markers, or specific questions may be assigned to markers.

Marking processes may include checks and balances, such as the teachers reviewing marked papers on a random basis to check marking and feedback quality.

The process described above requires significant resources, and this means that grading exams can be quite expensive. This puts a significant burden on educational institutions for example, and also those that provide financial support to educational institutions, including governments, endowments and students (and their families).

Online platforms have been conceived to attempt to streamline exam grading processes. These generally involve digitizing examination papers, and providing an interface to capture input from markers (including answer scores), and associate the input with examination papers.

Online platforms do not provide a scalable platform for building and managing a crowd of markers, while embodying processes that help assure the quality of marking results including feedback given to exam takers.

Examples include the MarkUs™ and GradeMark™ platforms. These platforms provide a web interface showing the exam taker's work in one field and web selection options in another. The exam marker reads the work of the exam taker, and then uses the mouse and keyboard to select among the options to assign scores and comments to the exam. The options available to the exam marker are generally selected at the beginning and remain static during the marking process. The MarkUs™ and GradeMark™ solutions do not improve significantly on the resources required and/or possible inaccuracy associated with paper based marking processes. The MarkUs™ and GradeMark™ platforms are deployed to allow teachers (as defined below) to mark the exams taken by their students. These platforms do not provide mechanisms for accessing and managing a crowd of markers as detailed in the present invention.

Online education has become prevalent. What are referred to as "Massive Open Online Course" or "MOOCs" have increased significantly the number of students accessing online education. Accreditations associated with MOOCs have generally not reached the acceptance levels of traditional courses provided in bricks and mortar settings in large part because MOOCs generally use online multiple choice type examinations as their main means of providing assessments, and this type of examination is not (considered suitable for a number of domains of learning (including for example soft skills), and also is not considered to be pedagogically satisfactory. Online education has numerous advantages, including scalability, reduced cost, and convenience to students (especially those living in areas far from educational institutions), however, there is a need for an examination taking and marking process that permits the use of written examinations including feedback, that are set and marked in a way that meets minimum standards that may confer acceptance levels on MOOCs that approximate those associated with traditional educational and assessment settings.

There is a need for computer system and computer implemented method that overcomes the shortcomings referenced above.

SUMMARY

In one aspect, a computer network implemented system for enabling intelligent crowd sourced examination marking comprising: one or more server computers linked to the Internet and to a database, and enabling one or more computer implemented utilities providing: (A) a marker community manager that enables authorized users of the system to access one or more features or functions for building and managing a crowd of markers ("crowd markers") associated with the system, and optionally dedicated to one or more authorized users, wherein the marker community manager includes or is linked to a profile manager for creating and updating a profile for each crowd marker ("crowd marker profile"), and storing the crowd marker profiles to the database; (B) an examination content distributor for making accessible examination content to crowd markers using one or more network-connected devices, the content distributor optionally enabling the import of scanned versions of paper based examination papers into the database such that they are associated with the examination writer; and (C) a marking manager that is configured to enable authorized users to (i) create one or more active crowd sourced marking projects, and (ii) to automate the management of one or more workflows related to the completion of one or more aspects of active crowd source marking projects; wherein the marker community manager, the marking manager, and the examination content distributor interoperate so as to enable, or initiate: (i) authorized users to generate one or more marking parameters associated with marking projects or associated marking activities, where the marking parameters may relate to marking quality criteria, and the marking parameters are stored to the database as a marking profile; (ii) a matching component for matching marking projects or marking activities to crowd markers, optionally using the applicable crowd marking profiles, so as to (i) suggest suitable crowd markers for the marking project, and (ii) optionally suggesting allocation of particular marking activities to selected crowd markers, or groups of crowd markers; and (iii) deliver applicable examination content for marking (including scoring and/or providing feedback on examination content) by selected crowd markers, or groups of crowd markers.

In another aspect of the invention, the system further comprises a training utility for training crowd markers for marking exams in one or more specified domains or for open marking projects on an on demand basis.

In a still other aspect of the invention, the marking manager is configured to: (A) suggest a group of test markers, or enable authorized users to define a group of test markers; (B) initiate the examination content distributor to deliver examination content to the group of test markers for marking of the examination content by the test markers; and (C) track and analyze the actions and/or feedback of the test markers so as to generate automatically one or more marking quality criteria; wherein the marking quality criteria are used by the marking manager to monitor and/or assess the performance of crowd markers.

In another aspect of the invention, the marking manager further enables one or more automated processes for acting on actions and/or feedback of crowd markers based on monitoring/assessment of performance of crowd markers based on the marking quality criteria.

In yet another aspect of the invention, the system comprises an integrated examination authoring tool that includes a marking guide creator, wherein the marking guide allows authorized users including teachers to define a set of parameters and/or information objects associated with marking an examination in a way that meets pedagogical and accuracy objectives, as determined by the authorized user of the marking guide creator, such parameters and/or information objects being collected by the system and stored to the applicable marking profile.

In another aspect of the invention, the system comprises an adaptive marking tool that is linked to the workflow manager and to the examination content distributor, and is configured to: (A) deliver to the crowd markers selected examination content based on their assigned marking projects or marking activities; and (B) guide crowd markers in marking the selected examination content in a manner that is consistent with the marking profile by integrating with the selected examination content one or more marking options and/or examination marking guidance messages based on the marking profile.

In another aspect, the system automatically links marking input of crowd markers and associates same with a file for a particular exam stored to the database, and enables aggregation of marking scores and feedback from different crowd markers so as to produce a corrected examination for delivery to the person having taken the particular exam.

In another aspect, the utilities including a content analyzer that is configured to analyze the examination content, and to access the marking profile for one or more suggested scoring instructions and/or feedback options, and based on the analysis of the examination content by the content analyzer, filtering the suggested options so as to suggest to crowd markers a smaller set of scoring instructions and/or feedback options for selection by the crowd markers.

In a still other aspect of the invention, the system is adapted to provide training data for one or more automated examination marking utilities or processes based on machine learning methods.

Computer implemented methods are also provided based on interactions of users with the computer system described herein.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
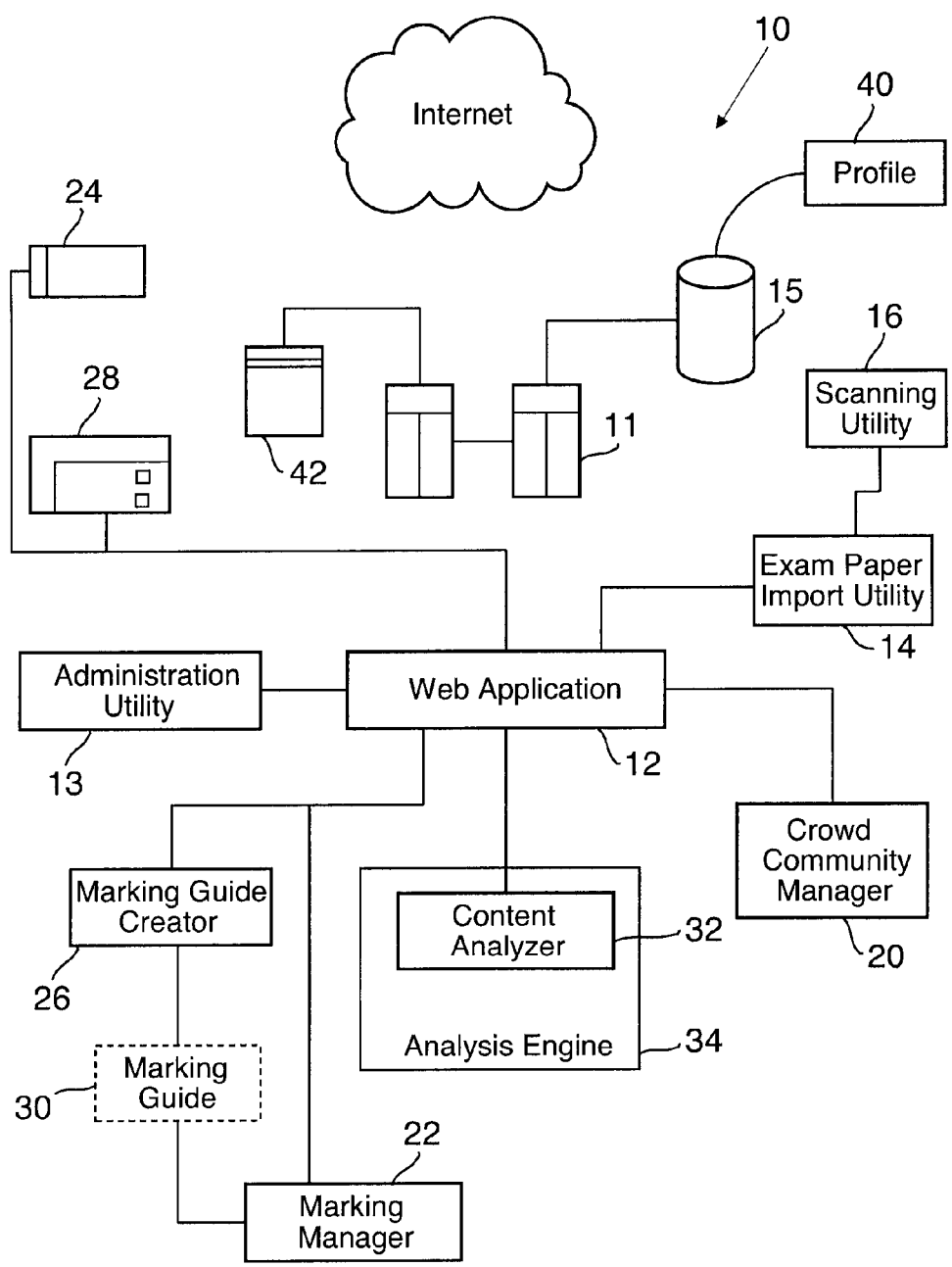
FIG. 1 is a system diagram of the system of the present invention, in one implementation thereof.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

Definitions

"exam" or "examination" refers to any educational assessment, whether in a paper or digital form.

This disclosure refers to "teachers", who may be teachers, teaching assistants, professors, instructors, coaches (for example personal coaches or corporate coaches), mentors, tutors, or their designates involved in supporting learning activities, who may be employed or otherwise engaged by educational institutions, businesses or government entities; "teachers" or their employers may also be referred to as "platform clients". Because the present invention applies to evaluation of various artefacts, "teacher" should also be understood to mean any evaluator.

"Students" are any who exams are created and/or marked using the platform of the present invention. The present invention applies to evaluation of various artefacts, so "student" should also be understood to apply generally to any user whose artefacts are to be evaluated by a crowd or pool of evaluators in a way that is systematized using the present invention.

"Users" generally refers to authorized users of the platform, which may include "students" and/or "teachers" as the context may require.

"Platform clients" refer to clients of the operator of the platform of the present invention. These are usually educational institutions such as universities, colleges, school boards and so on. Authorized users of platform clients are usually professors, teachers, or teacher assistants, who are utilizing the crowd resources of the present invention through the marker hub.

Specifically in an educational application of the present technology there may be different types of users. These may include "markers" who are the pool of marking resources. A "facilitator" may be a super-marker who sets a marking guide for example and monitors the progress of a marking project and the quality of the marking across multiple markers. A "proctor" may be a facilitator or may be a separate role. A proctor may handle on-boarding and off-boarding of papers, including for example management of printing and distributing exam papers in an application involving paper exams.

Platform Description

In one aspect of the invention, a computer network implemented method, and computer network implemented computer system ("Internet (platform)") (10) is provided, for enabling managed crowd sourced marking of examination papers. The Internet platform (10) includes a number of intelligent features that are novel and innovative, as further described below.

The disclosure explains the invention by referencing the example of marking exam papers. The platform may be modified for use for systematizing evaluation of other artefacts by a team of skilled humans. The platform may aid in the evaluation of documents consisting of for example business plans submitted for making application for an investment or grant; peer review of research papers; photos submitted as part of a juried photo competition; or a video submitted for annotation and inclusion in a library. Various uses of the present invention are possible. The various tools and workflow may be adapted for us in connection with other artefacts.

In one aspect, the Internet platform includes one or more server computers (11) that are connected to the Internet. The server computers (11) may be linked to a web server application (12) for managing the various features and functions of the Internet platform (10), and for enabling the computer network implemented method of the present invention. The web server application (12) may be implemented an application repository. The Internet platform may be implemented using a variety of different computer systems and computer program architectures.

In one implementation, the Internet platform (10) includes:

(A) An administrative dashboard (24) used by teachers to access platform features and functions, and manage crowd marking projects.

(B) A marker community manager (20) for managing a crowd of markers, as described below. The marker community manager (20) may incorporate a series of known features and functions used to build and manage a crowd, for the purpose of enabling the completion of projects based on crowd sourcing of activities. In accordance with the present invention, the marker community manager (20) is used to (i) build a crowd of markers, (ii) assess markers that are part of the crowd on an ongoing basis to establish their marking skill levels, (iii) train markers to improve their skills (including in selected domains where the markers have educational, training or work background, and also specifically in relation to particular examinations), (iv) track performance of markers, and (v) allocate compensation to markers, whether as explained below this consists of incentive points or financial compensation.

(C) An examination paper import utility for digitizing papers based examinations, and importing them to the computer system of the present invention;

(D) A marking manager (22) which is essentially a workflow manager that interoperates with the marker community manager (20) to initiate a series of processes for completing a particular crowd marking project, using the Internet platform (10) of the present invention. The marking manager (22) enables an administrator, who is often a teacher or a designate of a teacher, to define the parameters and settings of a marking job that is enabled by the present invention, monitor progress, manage open jobs, analyze results from jobs (in part to improve results for future jobs), and distribute results. The present invention also includes a marking guide creator (26) that enables for example teachers to create a marking guide having the features and functions described below. In one implementation, the marking guide creator (26) is a utility or module that is part of the marking manager (22).

The features and functions of the marking manager (22) and the marker community manager (24) may be seen as closely related, and in fact may be implemented using a single application or group of applications. The marking manager (22) may be seen as the one or more functional utilities that determine the parameters and attributes of a marking job implemented by the platform (10), and the marker community manager (24) may be seen as the one or more functional utilities that allow an administrator to build their community of markers from the overall marking pool or hub provided by the platform (10), and manage whom of this community or pool will be assigned the task established using the marking manager (22).

(E) An adaptive marking interface or dashboard (28) is also provided that, as explained below, may be used by teachers and then by markers in order to mark exams by operation of the Internet platform (10). The adaptive marking interface (28) is used to score particular examples and collect comments and feedback from markers, and associate the comments and feedback with particular pages of an examination. Various features of the adaptive marking interface (28) are described below.

A skilled reader will understand that the platform (10) may be implemented using a number of features similar to those used in social networking platforms, including the dynamic creation of groups meeting shared criteria; matching users based on shared interests and goals, and so on. Aspects of the present platform (10) may be implemented in a way that is made part of or links to conventional social networks. For example, social media pages dedicated to alumni may be used to promote and act as a portal to the crowd marking platform (10) of the present invention.

Prior to the present invention, it was not thought possible to apply Internet crowd-sourcing to marking papers in a way that met marking quality criteria. These criteria include consistency and delivery of feedback to exam takers. The inventors have discovered a number of different platform features, attributes and workflows that permit high marking quality standards, while permitting the efficiency and scale of Internet crowd-sourcing. The key insights of the inventor include:

(1) a novel an innovative mechanism for establishing marking criteria automatically, including based on marking of an exam using the platform, by a trusted group of markers;

(2) design of a series of intelligent features that enable the leveraging of a crowd of markers who are less trained or proficient than the trusted group of markers, but using the platform achieve marking quality scores similar to the trusted group of markers, in an efficient and scalable way;

(3) design of a series of quality control measures, and related automated escalation procedures;

(4) design of an Internet platform that allows administrators to build value in their crowd community to lower marking costs, and enable pedagogically sound examination procedures in connection with online learning platforms; and (5) design of an Internet platform that promotes adherence of crowd markers to quality standards, including using an innovative integration of incentives in platform operations.

Many other important insights and contributions of the inventor are explained herein, and also will be readily apparent to a skilled reader.

The server application (12) may include an administrative utility (13) that implements a series of standard Internet platform features, including defining the access of particular users to platform features and functions, and to information, based on administrative user defined permissions. The administrative utility (13) for example defines the different types of users (e.g. platform clients, who may be educational institutions, their teachers, and specific markers that are associated with a platform client for example through a crowd for that platform client built through the platform (10), or a crowd built dynamically for the platform client in connection with a marking project. The administrative utility (13) determines for example the particular users that set marking guides for a particular course offered by a particular platform clients, and who receives access to marking guides and when. A skilled reader will appreciate that in order for an examination process to have integrity, it is important to control who sets exams and who accesses marking guides and when to avoid any students gaining an unfair advantage through a breach of access to information rules.

Figure 2:
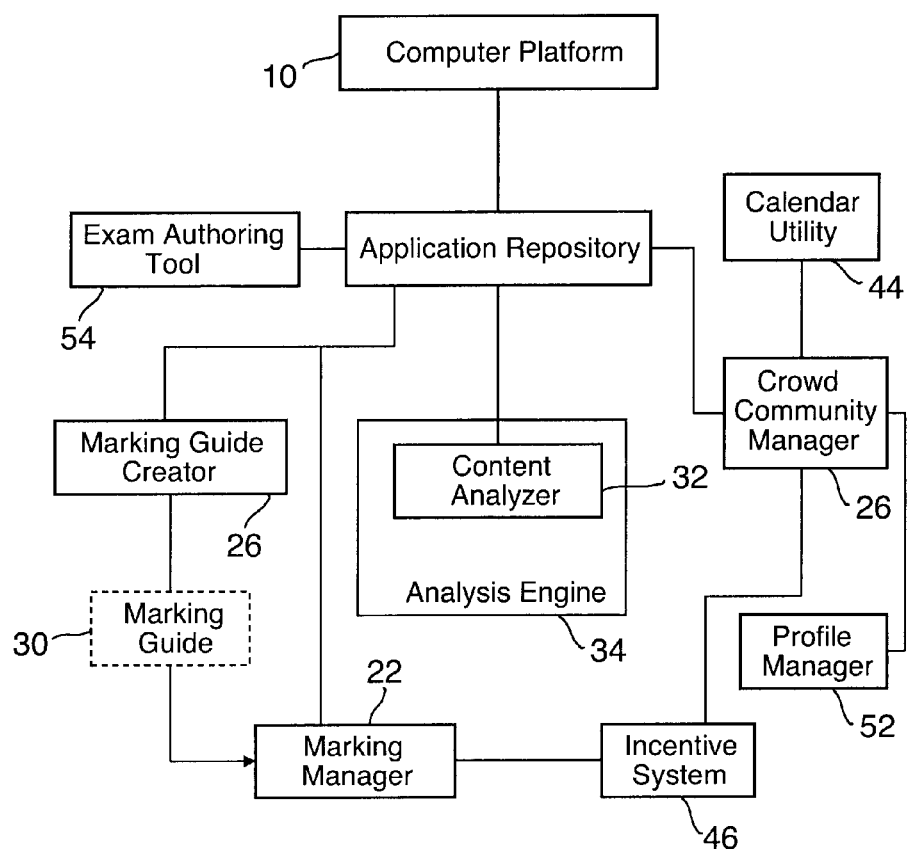
FIG. 2 is another system diagram illustrating the present invention, in another implementation thereof.

FIGS. 1 and 2 illustrate possible implementations of the system of the present invention, as explained below.

Figure 3:
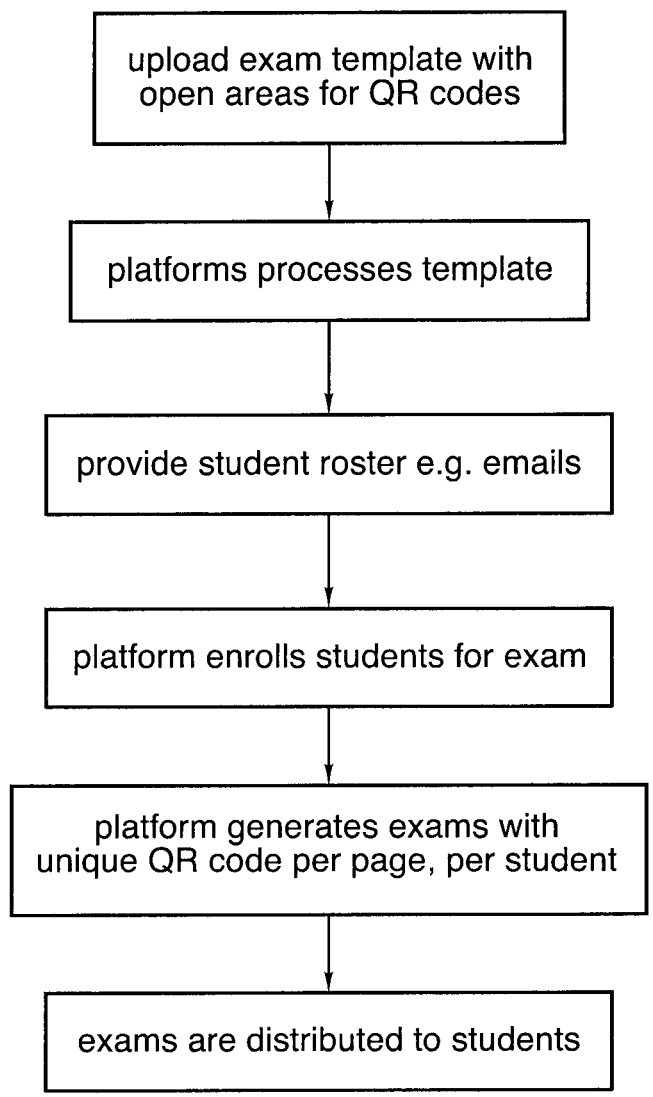
FIG. 3 is a flowchart illustrating one aspect of a computer implemented workflow in accordance with the present invention.

FIG. 3 shows one possible aspect of a computer implemented workflow of the present invention. Users of the platform (10) may: (1) upload an exam template, which may include open areas to receive QR codes; (2) the platform (10) processes the exam template; (3) particulars of students taking the exam such as by providing a unique identifier for each student such as their email address; (4) the platform (10) enrolls the students taking the exam; (5) the platform generates the exam papers with a unique QR code or other digital identifier; the exam papers are generated in an anonymous form, but each QR code is associate with a particular student in the platform (10); and (5) the exams are distributed to the students.

In one particular implementation the exams are scanned, so as to create for example a series of JPEG images, which can be uploaded to the platform (10). In one aspect, the platform (10) adds the QR codes.

Figure 4:
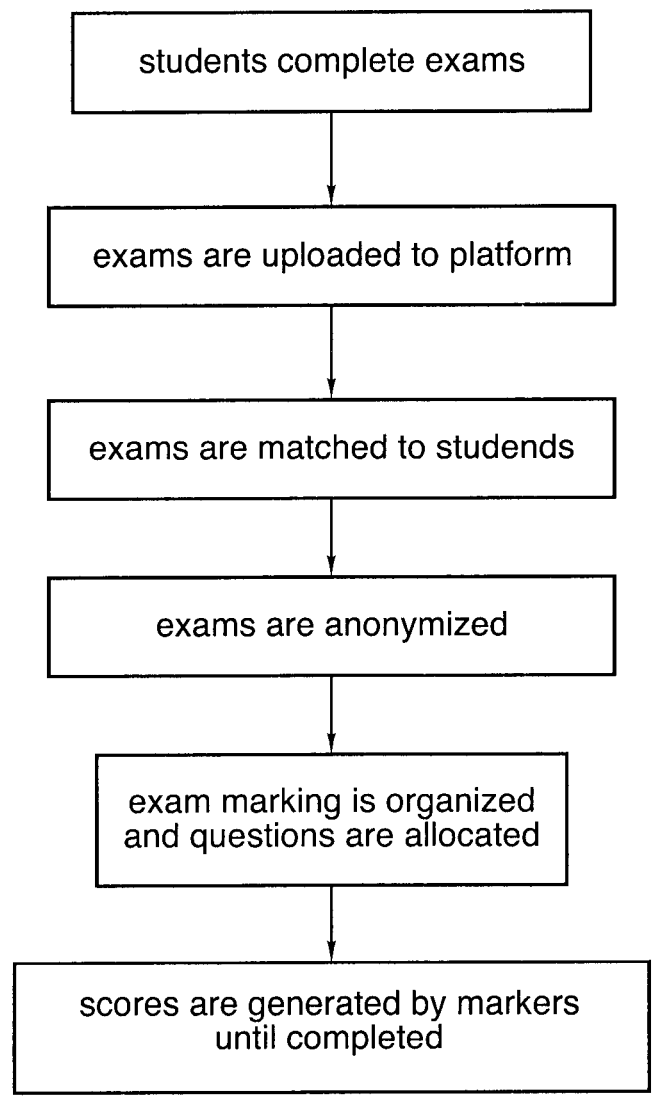
FIG. 4 is another flow chart illustrating another aspect of a computer implemented workflow in accordance with the present invention.

FIG. 4 shows another possible aspect of a computer implemented workflow of the present invention, in which: (1) students complete their exams; (2) exams are uploaded to the platform; (3) exams are matched to students; (4) exams are anonymized; (5) the platform (10) organizes the marking and allocates questions to markers automatically; and (6) the markers record their scores, and once all scores have been recorded, the marking comes to its conclusion.

The exams for example may be printed out, and distributed to students. The exams may be in paper or electronic form. The platform (10) may include or be linked to one or more web pages that enable students to Marking Guide Creator In one aspect of the invention, the platform (10) includes a marking guide creator (26).

In prior art solutions, a marking scheme is often provided, and used by markers to mark an exam. A "marking scheme" refers generally to an outline of an exam, including a list of sections, questions and/or sub-questions, and the associated scores.

A more detailed "marking guide" in accordance with prior art solutions, may also be provided, which usually consists of the marking scheme, but expanded to include notes, sample answers, discussion of possible answers, guidelines for providing comments, and other similar content.

A marking guide (30) in accordance with the present invention consists of a collection of marking rules associated with the marking of a particular exam, as well as any content or material that a teacher may link to a particular exam, including a particular section, question, or sub-question of an exam.

One aspect of the marking guide (30) of the present invention, is that it embodies: (A) marking content for use in connection with marking of particular question to a particular exam, the marking content including a particular score or comment, and (B) parameters for triggering the platform (10) to display marking content in a manner that adapts to the content of a student's exam answer. A key focus of the marking guide (30) is to enable configuration of the marking dashboard (28) to enable the intelligent marking features explained below.

A skilled reader will also appreciate that a marking guide (30) may also include notes, sample answers, discussions of possible, answers, guidelines for providing comments, and other similar content.

In one aspect of the invention, the marking guide (30) includes a series of comments that are appropriate for different possible comments to specific exam questions ("available comments"). As explained below, the particular available comments displayed to a marker using the marking dashboard (28) may be adapted based on the associated marking rules and the student generated content. In a further aspect of the invention (as explained below) the available answers may be further adapted based on the current state of the marker profile.

The marking guide creator (26) may be implemented in a number of different ways.

In one aspect of the invention, the marking guide creator (26) enables for example a teacher to import or define information associated with the exam (such as course or title for the exam, and date for the exam), the questions for the exam, and an associated score for each exam. A teacher may also use the marking guide creator (26) to define a series of attributes associated with a particular exam such as the different questions and optionally sub-questions associated with an exam. The platform (10), in one implementation creates an identifier for each question or sub-question, and these identifiers are used by database management utility (36) to store exam answers on a question by question basis to the database (15), as further described below, in on implementation of the present invention.

In one implementation of the present invention, a teacher may use the marking guide creator (26) to assign for example a difficulty score with each question or sub-question, or some other such criteria. The difficulty score may relate to the marking of the particular question or sub-question, which may be based for example on the importance of providing meaningful feedback on the student's answer to that question, for example in the regards to ensuring that the marking of the exam meets associated learning objectives. The difficulty scores may be used (as explained below) in connection with the intelligent allocation of marking tasks to crowd markers.

The marking guide creator (26) may also be used by the teacher to define certain attributes for how the marking dashboard (28) will present to markers in connection with a particular example, and optionally in connection with specific answers to particular questions of the exam.

In one implementation, the marking guide (30) may include a collection of administrator defined "marking rules". These are usually defined by an instructor or teacher, and may be defined using one or more templates, which the instructor or teacher may modify, for example using the administrative dashboard (24). In addition, the marking guide (30) may include one or more "marking performance rules" for assessing the performance of markers relative to one or more marking quality assurance criteria for assessing the quality of marking for a particular question of a particular exam (as opposed td general performance criteria that may be defined by the platform operator more generally).

"Marking rules" includes for example rules for assigning marks for individual answers for example, marking guidelines, and providing feedback guidelines (and associated content) to support markers providing valuable feedback to examination writers.

"Marking performance rules" may consist of additional rules for assessing the performance of markers relative to standards of consistency, or provision of meaningful feedback. The marking performance rules enabled the platform (10) to evaluate the performance of markers, and based on such performance trigger actions (such as re-testing, additional requirements for training of markers, re-marking, incentives, and so on as explained below).

Particular examples of marking rules or marking performance rules are provided below.

Marking Dashboard

The marking dashboard (28) may be implemented as a graphical user interface that may be configured to include: (A) one or more navigation objects that enables a marker to navigate within student generated content assigned by the platform (10) to the marker for marking, (B) a viewer for viewing particular student generated content, (C) one or more utilities for displaying marking content in conjunction with student generated content, and (D) one or more buttons for accessing tools or content associated with the marking of student generated content.

A skilled reader will immediately understand that the marking dashboard (28) may be implemented as a specialized, adaptive and interactive user interface that guides markers through the process of marking student content assigned to them by the platform (10), based on a set of rules defined by teachers, using the platform (10). The guidance of the markers is itself adaptive in the sense that it is based on current knowledge accumulated by the platform (10) based on the aggregated marking activities of relevant community of teachers/markers.

Figure 5:
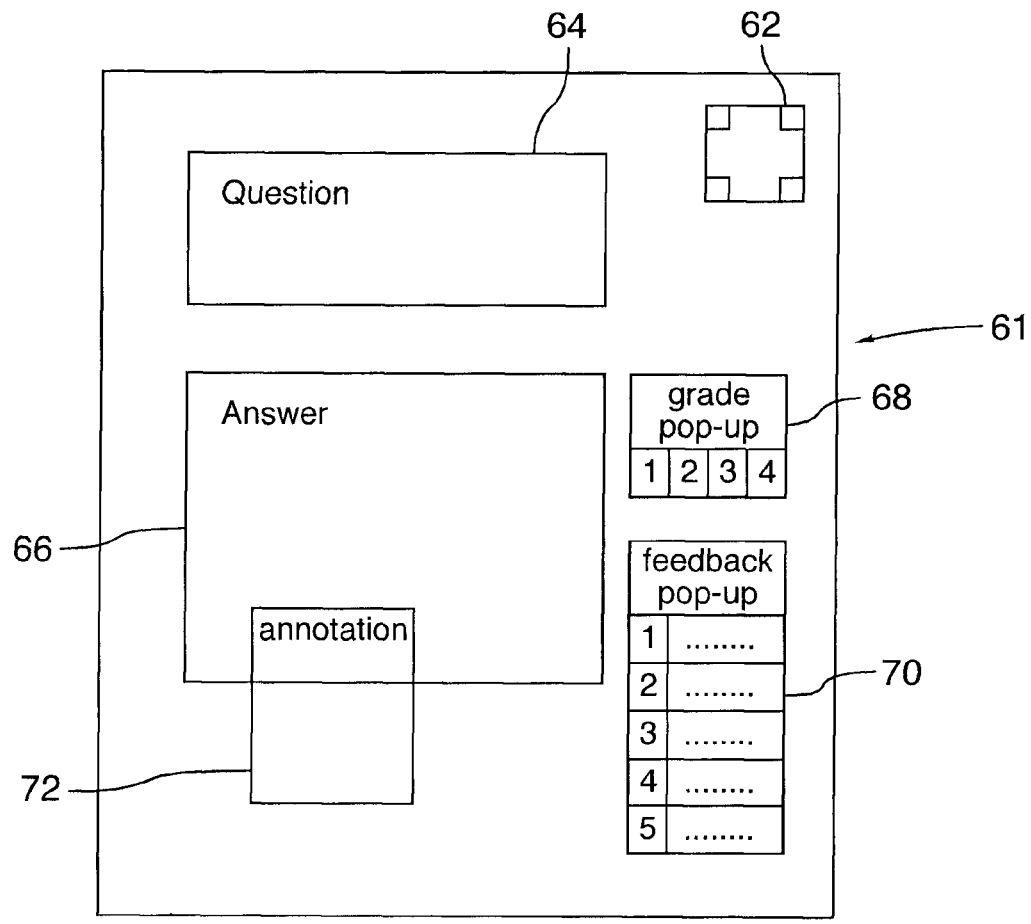
FIG. 5 illustrates one aspect of a marking interface of the present invention.

A representative marking dashboard (28) is included as FIG. 5 for example. A marker view (61) may be presented in different configurations or embodiments. In one embodiment, a marker view (61) is presented for each question/answer of an exam. However, a page may contain multiple questions, and each marker view (61) may be based on a single page of an exam, whether it includes one or more questions/answers. The marker view (61) is generally anonymized. It may present the digital identifier or QR code (62). The marker view (61) may reproduce the question section (64) and then the answer section (66). A series of pop up interfaces may be selected by a user (using a menu) or may be driven by triggers such as analysis of the content of the answer.

For example, a marking pop-up (68) may be presented based on a marking scheme associated with the evaluation. In this case a 1 through 4 marking scheme is shown as an example. But various other marking schemes are possible.

A feedback pop-up (70) may present a list of possible feedback comments. These may be based on for example analysis of the content of the answer. The comments presented may also be based on the initial score provided by the evaluator. These comments may be based on semantic analysis of comments provided by other evaluators for answers that received a similar score, and then a determination of a number of similar answers provided.

Figure 6:
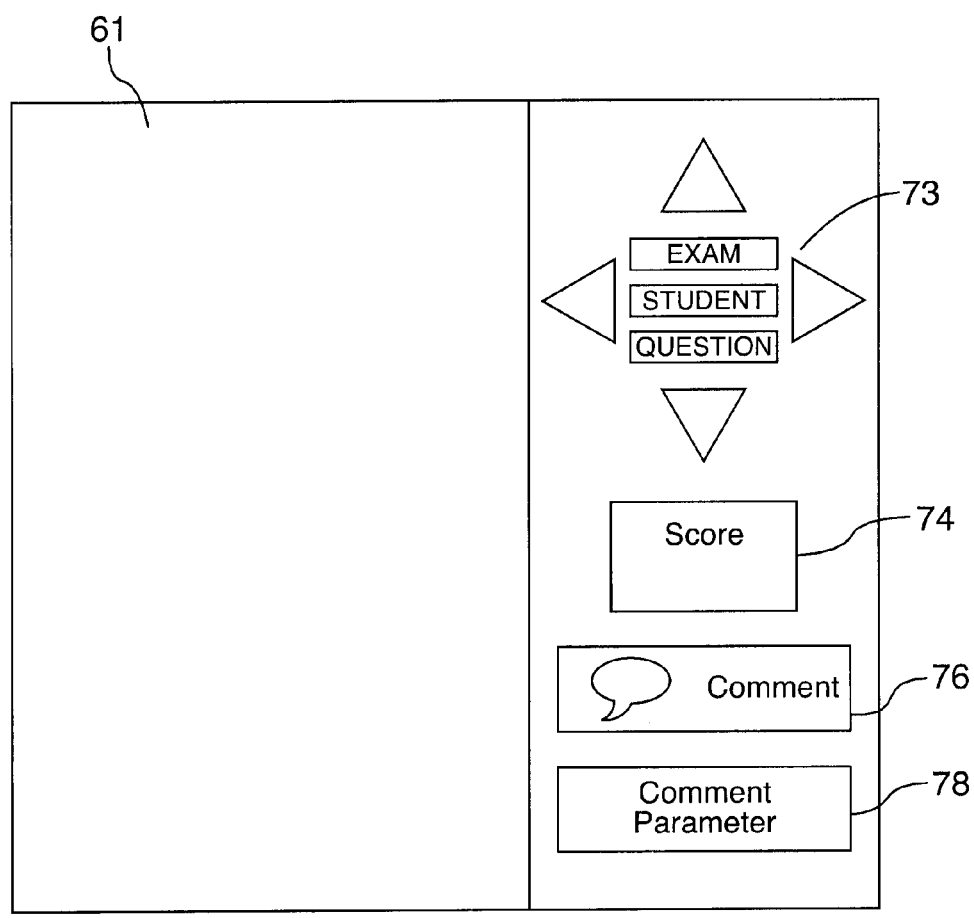
FIG. 6 illustrates another aspect of a marking interface of the present invention.

In another possible embodiment, as shown in FIG. 6, further navigation features may be presented as part of the marking dashboard (28). As previously explained, a set of specific evaluations, such as specific answers from a plurality of learners may be allocated to a particular marker in the platform (10). In one aspect of the invention, the platform (10) provides tools that make it easy for the marker to navigate between answers and their scores, as well as associated comments, very easily. This in part promotes consistency, as prior to finalizing their marks, the marker himself/herself can self-regulate by comparing the scores and comments that they give to ensure that they have been consistent. A set of navigation buttons (73) may be presented including arrows allowing navigation within the answers assigned to the marker. A score button (74) may be provided on the side (rather than in an overlay). Similarly a side bar comments feature (76) allows the marker to provide its comments. A comment parameter button (78) may allow the marker to define certain parameters for comments such as for example whether comments will be seen by the student, or Whether they are solely for sharing with other markers for example. In other embodiments, markers are not permitted to see the scores given by other markers or their comments, however facilitator may see this information.

Figure 8:
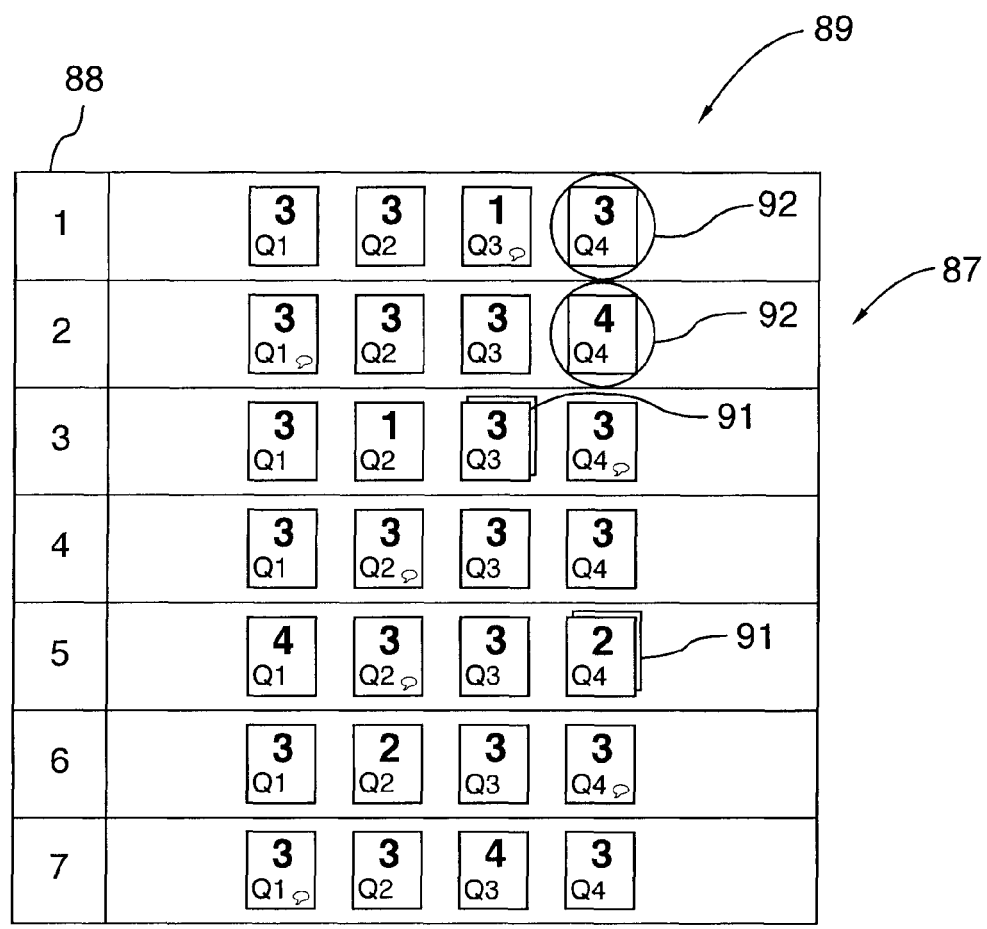
FIG. 8 is one possible aspect of a marking management interface of the present invention.

A separate button may be provided to allow markers to access a higher level view displaying a grid of tiles representing questions/answers assigned to the particular mark. A series of rows tiles may be provided each row associated with a particular student: 1, 2, 3, 4, 5, 6, 7 . . . Q1 indicates question 1, Q2 indicated question 2, Q3 indicates question 3, and Q4 indicates question 4, and so on. An example of such an interface is shown in FIG. 8. Various other arrangements are possible. The tile view may allow representation of a number of different indicators. A number may indicate the score assigned by the marker for the particular answer. A bubble on a tile may indicate whether or not the marker provided feedback. Placing the cursor on the bubble may present the comments provided. The marker may use this view to find particular answers/comments and review answers provided again by clicking on tiles, and possibly comparing these to other answers/comments. The marker may use this view to alter its scores or comments prior to final submission.

Markers may or may not be able to see the scores assigned and comments provided by other markers depending on for example pedagogical considerations.

The particular view shown in FIG. 8 is in fact a manager view or facilitator view, in that multi-marker features may be presented. One aspect of the marking manager is that it permits the efficient allocation of marking tasks, yet in a way that promotes consistency and quality of marking. A selected number of answers may be assigned for marking by several markers. The specific occurrences of this for a particular question for example may be highlighted by some visual indicators such as a stack of tiles (91) as shown in FIG. 8. Furthermore, a stack of tiles where there is lack of consistency between answers that meets a threshold as per the marking guide for example, may be highlighted by another visual indicator such as a flag or colour of the stack of tiles.

In one implementation of the invention, the marking dashboard (28) may enable the marker to access functions and resources, such as for example support materials related to a particular examination. In one implementation of the invention, the marking dashboard (28) is adaptive to the marker's progress in a marking workflow. For example, if a marker is making a particular examination, examination section, or question, the marking interfaces (A) makes the relevant portions of the marking guide available, (B) presents relevant supporting materials, and/or presents options for feedback relevant to for example the particular question that the marker is marking.

In one particular aspect of the invention, the marking dashboard (28) is implemented so that the content and functions accessible using the marking dashboard (28) are adapted by operation of the platform (10). One aspect of the adaptability of the marking dashboard (28) is based on integration of the marking dashboard (28) with the rules defined by the applicable marking guide (30) such that relevant rules and content are automatically accessed as a marker progresses through the marking of particular questions that are part of a particular exam, as further explained below.

The platform (10), in one aspect, may include a content analyzer (32) that analyzes the content associated with a particular answer provided by a student, and automatically filters the available answers and presents to the marker a series of possible relevant answers, based on the content of the student's answer to the question. Similarly, associated marking content such as for example sample answers, reference materials, or other content, may be filtered based on the content of the student's answer, and based on the student's answer the content or functions displayed using the marking dashboard (32) may also be adapted.

In one implementation of the present invention, marking content is displayed using an overlay to the student generated content that is implemented by the marking dashboard (28). The overlay may be configured to (A) detect location of student generated content, and (B) dynamically display marking content related to particular student generated content in a location that does not obscure viewing of the student generated content and yet is likely to be perceived by a marker as being associated with the related student generated content. In one implementation of the invention, the overlay is configured to embody a series of rules for placement of marking content in connection with student generated content that meets these objectives. In one implementation of the present invention, as shown in FIG. 5, marking content may be displayed by the platform (10) using a series of pop up objects (such as one or more menus that enable a marker to select applicable options in terms of question scores or relevant comments regarding answers). In one implementation, the pop-up objects may be displayed automatically as a marker navigates within student generated content assigned by the platform (10) to them. Other possible implementations are shown in FIG. 6. More specifically, in one implementation of the present invention, when a marker reaches a portion of student generated content that has a pop-up object assigned to it, the pop-up object is displayed in a way that is likely to be perceived as being linked to the associated student generated content, without obscuring the underlying student generated content. The marker may interact with the pop-up object for example by clicking on the object or pacing his/her cursor on the object, to reveal underlying options or further menus, as the case may be.

For example, the pop-up may be displayed as a graphical object that has the appearance as a sticky note that may contain relevant information, and also menu items and optionally links to other information. Various keyboard shortcuts are possible for accessing selected functions such as navigating through menus and providing desired digital input. For example the "tab" key may be used to access a scoring dialogue, which may initiate the display of "0, 1, 2, 3 and 4" as possible scores for a particular question. The marker may use the keyboard to choose the particular score. Selected scores are logged by the logger (38) to the profile in the platform (10) for the particular exam. The platform (10) also logs the particular marker who provided that score.

A skilled reader will understand that the marking dashboard (28) of the present invention incorporates one or more intelligent features, and that these intelligent features may include the ability to suggest automatically pedagogical feedback comments that may be appropriate based on the answer given by the student.

The content analyzer (32) may be implemented as part of an analysis engine (34). The analysis engine (34) may implement a series of known analytical operations or analysis utilities. The marking dashboard (28) may implement a series of processes that are supported by the analysis engine (34). For example, suggested answers may integrate wording used by a particular student in an answer to a particular question, in order to increase the relevance of a comment to a particular answer given by the student. The analysis engine (34) may also include for example sentiment analysis operations in order to monitor the sentiment associated with communications through the platform, including for example marker content but also possible interactions between markers and students through the platform.

The marking guide (30) in one particular aspect of the invention is configured to be adaptive as well. The platform (10) may be configured to capture and utilize learning that is accumulated in connection with marking projects that are in progress. Based on parameters that may be set by operation of the platform (10), for example based on settings defined by a teacher using the marking guide creator (26), linked to the administrative utility (13), the platform (10) may track new comments being made by markers (or for example selected markers who have a minimum "trust score"). In one implementation, the platform (10) (using the analysis engine (34)) detects when a significant number of markers have provided similar answer comments for the same questions, and the platform (10) automatically updates the available questions to include such detected comments. A skilled reader will appreciate that numerous other such intelligent features are possible.

Examination Paper Input Utility

In one aspect of invention, the platform (10) may include an examination paper import utility or exam import utility (14) is provided.

The examination papers may be in paper or digital form. If the examination papers are in paper form, the examination paper utility (14) links examination papers with the examination marking processes of the present invention, as further explained below. In one aspect of the invention, the examination paper input utility (14) may be implemented as a specialized or modified digital scanning utility (16) that scans paper based examination papers in a way that inserts the scanned examination papers in the examination paper tracking and processing workflows of the present invention.

In one implementation of the present invention, the server computers (11) are linked to a database (15). The exam import utility (14) may be used to: (A) parse an examination paper based on a question and/or sub-question by sub-question basis, which may be based on rules that are part of the marking guide (30), and (B) store to the database (15) examination on a question by question basis and/or sub-question by sub-question basis, using the database management utility (36). The storage of exam answers on a question by question and/or sub-question by sub-question basis enables a range of marking assignment options, and also the automated tracking and analysis of marking activities as further explained below.

In one aspect of the invention, the exam import utility (14) includes one or more computer implemented processes for streamlining the collection of data sets related to examination papers. For example, each page of an examination paper may be associated with a unique digital identifier such as a bar code or a QR code. One aspect of the invention is a computer implemented workflow for onboarding paper based exams into the platform so as to enable managed crowd sourcing of papers, in an intelligent manner, using an Internet platform. One contribution of the invention is a platform design and a series of workflows that streamline the onboarding process.

The digital identifier may identify each page and also enable the identification of each page with an exam writer. This enables the tracking of exam pages, maintains the anonymity of the exam writer, and also enables the exam score to be assembled and associated with the exam writer in order to provide the exam writer their score in a way that ca be validated in order to ensure integrity in the exam marking process.

The exam import utility (14) may be configured to: (A) obtain any identifier for a particular exam, and optionally also an identifier for each page of an exam; (B) create a unique code for each exam page in the platform (10) and create a file in the database (15) for each exam page that is associated with the applicable unique code; (C) create an image of each exam page so that any page identifier on the exam page is visible; (D) create a text version of each exam page; (E) store each image and associated text version with the associated file; (F) link associated files so as to define a database entity for each exam where the database entity is based on a file structure that reflects the structure of the exam comprising questions and optionally sub-questions organized in a hierarchy.

In one aspect, the exam import utility (14) creates the database entity for each exam such that a logger (38) may track and control any access to or interaction with each exam, by operation of the platform (10) of the present invention. This ensures that access to exams is based on platform controlled processes, and also enables the monitoring and management of marking activities through the platform (10).

In one possible implementation of the invention, the scanning utility (16) includes an optical character recognition utility that generates digitally a text version of the student generated content. The text version of the student generated content may be used, for example, to enable the content analysis operations described in this disclosure.

Various other mechanisms are possible for importing content to be evaluated into the platform (10). For example, a mobile application may be linked to the platform (10) that allows photos to be taken of content to be evaluated such as a completed exam paper, and the photos uploaded to the platform, analyzed, and logged using a digital identifier such as a QR code.

Alternatively, a skilled reader will appreciate that the platform (10) may also be used to enable the marking of student generated content that is created digitally, for example by using a computer program or Internet enabled platform for viewing examination questions, and providing answers to questions, digitally.

A skilled reader will understand that the exam import utility (14) may be used as a mechanism to streamline the collection of data sets for third party processes, such as automated digital marking platforms for example.

Secure Exam Identification

In one aspect of the invention, each examination paper exists in the Internet platform (10) as a unique data object that is anonymous, in that the identity of the individual taking a particular examination is not available, or access to this information is restricted. This ensures that a marker cannot determine the individual with whom a particular exam paper is associated, thus limiting opportunities to seek to influence the marking result by approaching a marker.

First, in accordance with the present invention, a sizeable crowd is leveraged making specific markers of specific exam papers difficult to identify.

Secondly, the Internet platform (10) may implement specific platform features for protecting the identity associated with exam papers. As stated earlier, a unique barcode is often associated with a particular exam paper. The barcode is normally used in conventional systems and methods to track the exam paper in an exam marking process. In one aspect of the invention, a unique and innovative exam identification process is provided that reduces the likelihood of interference with the marking process over conventional approaches. For example, in one aspect, as part of the on-boarding process, the computer system (A) collects graphical code information such as bar code information, and (B) also obtains a set of identification information for each exam writer ("writer identification"). The writer identification may be used to generate a unique profile for the exam writer in the platform (10). The writer identification may include a set of biometric data for the exam writer. The computer system may create a unique identifier for each exam that is both associated with the exam paper and also with the exam writer, and that does not permit the derivation of either the graphical code information or the associated identity of exam writer. For example, the computer system may be configured to generate a secure key ("exam key") that is based on encryption of a file containing the bar code information and the writer identification that is used to track each exam paper in the system, but prevents the markers from accessing this information. The exam key may support the delivery of a marked exam to the exam writer (as explained herein, and based on the content distribution processes of the platform (10)), while maintaining anonymity of the process, and protecting the integrity of the online marking process from security attacks.

A skilled reader will appreciate that the system of the present invention may include or link to various technologies or processes for providing identity authentication of exam writers and also markers. Further illustrating possible example implementations, exam writers may upload their thumb print image when registering for an exam. Invigilators may collect and place the associated thumbprints onto the exam page. The associated images may be captured and compared by the system to determine whether there is a match, and then obscured on the pages for marking. This mechanism can be used to identify examination content with an exam writer using biometric authentication. The system may also use speech recognition, facial recognition and/or electrocardiogram signal recognition technologies or processes.

The platform (10) may include one or more security features for ensuring that markers can only obtain access to information that they are authorized to access. For example, the platform (10) may create a profile (40) in the database (15) for each exam writer, and this profile may include the relevant writer identification, and other information for the exam writer such as their name, address, student number and other information. However, this information may be encrypted so as to restrict access for example only to an administrative user who may be restricted access to this information unless the administrative user has the proper security credentials, using one or more prior art secure data access technologies.

Marking Manager

A marking manager (22) may be implemented using one or more utilities of the Internet platform (10). The marking manager (22) may be linked to the administrative dashboard (24) that provides a number of tools for enabling authorized users of platform clients to establish parameters of an active marking project or "job", for execution by the Internet platform (10).

Figure 7:
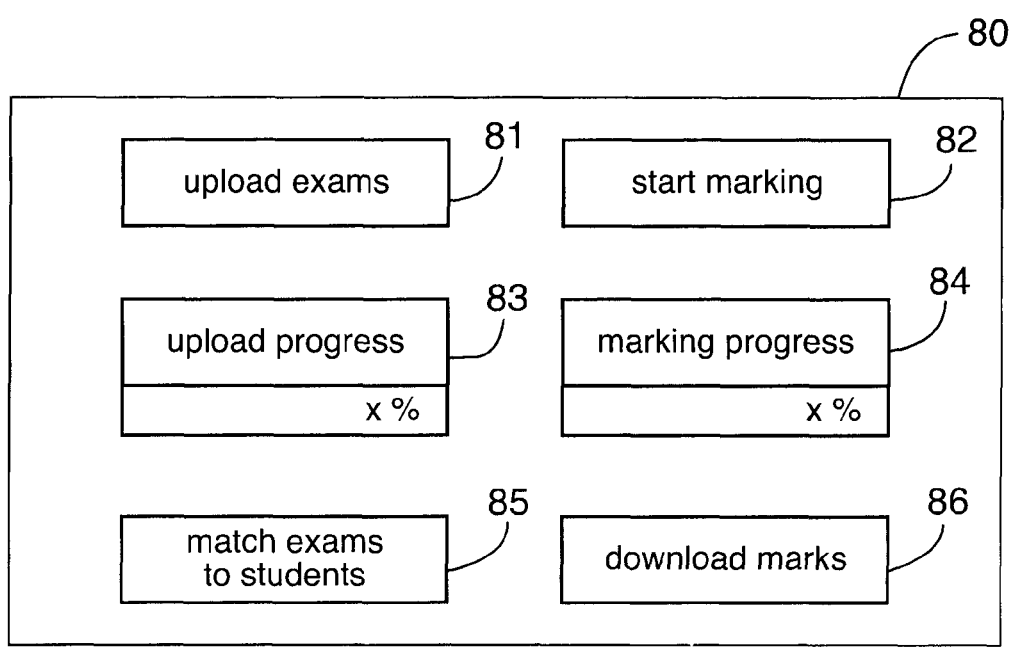
FIG. 7 illustrates one possible implementation of a marking dashboard presented by the computer system of the present invention.

FIG. 7 illustrates one possible embodiment of the administrative dashboard (24). In one aspect, the administrative dashboard (24) presents a graphical user interface that includes an upload exam button (81) and a start marking button (82). Once upload exams (81) is selected, the administrative dashboard (24) presents one or more instructions for processing exams or other artefacts according to the workflow described in this disclosure. The administrative dashboard (81) may include an upload progress button (83) which shows a percentage of completion visual indicator depending on the state of the platform in the exam upload workflow. In addition, a match exams to students button (85) may be provided, which may initiate automated matching of exams created in the platform (10) to relevant students registered to the platform.

Also as shown in FIG. 7, a start marking button (8) may be provided which an authorized user of the platform uses to access functions of the marking manager (22). The marking manager (22) presents a series of screens that enable the allocation of evaluation or marking tasks to a pool of skilled humans. The state of completion of the various task involved in completing a particular evaluation/marking project may be tracked, and used to display a percentage of completion value using the marking progress button (84).

A download marks button (86) may provide access to various features for accessing marks. For example scores may be downloaded as a spreadsheet file. The platform (10) may also include various tools for analyzing scores and presenting reports based on such scores.

A skilled reader will appreciate that the marking manager (22) may be implemented using similar tools or resources to those used for a "workflow manager". The marking manager (22), including through the marking rules and marking performance rules, enables the authorized users (usually an administrator who may be a teacher or administrative staff appointed by a teacher) to define a particular workflow as it relates to managing a particular marking "job" with its associated criteria.

A representative workflow associated with completion of a marking "job" (including configuration of marking rules and optionally marking performance rules) is provided below under the heading "Example In Operation").

In one aspect of the invention, the marking manager (22) enables the tracking of a plurality of open marking "jobs" and associated criteria, which may be based on the criteria discussed above in connection with establishing marking guide (30), or may be based on these criteria. The criteria may include: (a) the domain of the exam (e.g. "MATH"), (b) a set of tagging criteria for more specifically defining the subject matter of the exam, or the tag may relate to specific questions or groups of questions that are part of the exam, such as "CALCULUS; DIFFERENTIAL EQUATIONS", (c) a level of difficulty for the exam, groups of questions in the exam, and/or particular questions, (d) time available for completion of the exam, (e) identifier for a related or similar exam in terms of subject matter and/or difficulty, (f) administrator's preferences in terms of for example marking quality score criteria for acceptable crowd markers, minimum educational requirements of crowd markers, availability compensation or incentives for marking exam, groups of questions, or selected exams, and so on. A skilled reader will appreciate that the better tagging that is provided through the marking manager (22), the better matching will be possible using the features of the marker community manager (20). A skilled reader will also appreciate that the collection of metadata by operation of the platform, enables a series of intelligent features based on matching markers (based on their education, expertise, and/or aptitude, as well as other factors) with specific marking tasks, including in an automated way.

Platform clients may use the marking manager (22) to upload to the platform (10) resource materials, and if applicable link particular resource materials to particular examination papers, examination sections, or questions.

The marking manager (22) may include various features or functions similar to other workflow managers, such as the ability to track progress and degree of completion of open projects, generate estimates as to time of completion, trigger alarms when marking projects appear to be delayed, and so on.

The marking manager (22) is linked to the communication utility (42), as explained below, for example to send reminders, updates, messages intend to inspire action from markers and so on.

The marking manager (22) may include or be linked to the incentive system (46) that is described in connection with the "Example In Operation" below.

The marking manager (22) may also be used to generate parameters for example for open calls or other campaigns to attract markers for a particular job, if crowd marking requirements cannot be met for example based on resources available through the marker community manager (20).

The marking manager (22) may also enable the administrator to define one or more criteria for programs designed to train markers, including for particular requirements related to a job. In one implementation of the invention, the platform (10) provides one or more templates for designing sample examination papers for testing marker competency ("test exam"). In one implementation, markers for a particular examination must complete one or more test exams, and the results are logged to the platform (10), and these results may affect whether a marker is accepted to a particular marking group, the complexity of questions that are assigned to the marker for marking, compensation provided to a particular marker and so on. Various segmentation strategies based on test exam performance are possible.

In one implementation, the test exam, in one implementation, presents as an examination paper in the queue of examples, such that the marker is not aware that they are being presented a test exam.

In a particular implementation, based on marking rules associated with a particular examination and associated sub-community, a test exam may be presented to one or more markers randomly after a certain number of exams are marked, or if the results of analysis of marker performance fall below one or more thresholds, or based on other parameters.

A series of use cases follow to illustrate possible implementations of this aspect.

Marker Community Manager

In another aspect of the invention, the Internet platform includes the marker community manager (20), which may be implemented as one or more utilities that enable a series of functions associated with the development and management of an online hub for markers associated with the marking community or crowd associated with the platform (10). One aspect of the invention is providing a scalable crowd-based marking community, thus providing an efficient mechanism to access and manage the significant resources involved marking papers. The marker community manager (20) also provides a mechanism to connect demand for marking resources with pools of talent for providing these marking resources, which may be distributed across geographic locations and demographic groups, but are connected to the organization requiring marking resources through the Internet platform (10).

The marker community manager (20) may be implemented as a series of utilities, similar to those that are normally used to build crowd based communities and create engagement with crowd members around platform objectives. In accordance with the present invention, such utilities are adapted to enable the recruitment of a hub of potential markers, and a series of tools that enable platform clients to recruit from the hub markers who are available for the purpose of crowd marking jobs in accordance with the present invention.

The marker community manager (20) in one implementation presents a series of Internet enabled tools or utilities that enable (A) recruitment of one or more crowds interested in engaging with the platform client in regards to one or more crowd marking campaigns; (B) management of lists of crowd members, and associated parameters and information, including management and annotation of information related to the suitability of crowd segments for particular crowd marking campaigns; (C) accessing reports and metrics (including reports generated using the analysis engine (34) regarding the performance of crowd segments relative for example to marking quality parameters; and/or (D) annotating information for crowd segments to improve optimization of allocation of marking tasks amongst crowd segments.

In another aspect of the invention, the marker community manager (20) includes one or more utilities for targeting crowd or crowd segments created or managed by an administrator using the marker community manager (20). In one implementation of the present invention, the administrator may use one or more criteria or parameters established using the marking manager (22) in order to enable the targeting of the crowd or crowd marker lists or segments created using the marker community manager (20). In one aspect of the present invention, the marker community manager (20) includes a matching engine (50) that enables the matching of crowd marking jobs with crowd markers who match the criteria associated with the crowd marking job, including for example using one or more known segmentation techniques.

For example, in one implementation the matching engine matches marking requirements with the profiles of markers from the marker hub. In one implementation of the manager the marker community manager (20) includes a profile manager (52) for building and managing profiles associated with each marker. In one implementation, the profile manager (52) may enable a platform client to access a common profile of a marker that is shared across the platform (10) and that may be accessible to all platform clients. In addition, the profile manager (52) enables the collection and addition to the profile for each marker of additional information concerning markers, which may include for information that is automatically captured based on crowd marking jobs initiated by the particular platform client, and that may be based on configurations that may have been created by the administrator using the marker community manager (20). For example, an administrator may also create a custom configuration for calculating a quality marking score based on criteria that may relate in particular to the platform client's considerations. As another example, an administrator may refine a matching profile established on the platform (10) for use by the matching engine (50) to match crowd markers to parameters associated with a particular job. These matching profiles may be developed for application across all jobs for the platform client; categories of jobs based on shared parameters; or on a job by job basis.

Various activities of markers in the platform (10) may be logged for example by the profile manager (52). The profile manager (52) may determine a trust score for each marker, which may depend on a range of criteria such as an evaluation of the consistency of the marker's marking, how well the marker conforms to marking guide requirements (such as whether they provide comments, the lengths of their comments, and so on). The content analyzer (32) may be used for example for qualitative analysis of marker comments. In addition, the marker community manager (20) may trigger from time to time, or a facilitator may trigger, an audit of the quality of the marker's scoring and comments. There may be a peer review component to a trust score in that markers may be permitted to view some of the scores and/or comments of their colleagues and flag certain scores/comments for review by a facilitator for example. Various scoring mechanisms may be used to determine a trust score, and also for the trust score to change over time.

The trust score may be based in part on the credentials of the marker such as their educational background, their work training, their awards or recognitions and so on.

The trust score for marker may also be context specific. For example, a marker may have a very high trust score in one domain of knowledge or expertise, and a lower one in another.

The trust scores may be used by the platform (10) to automatically allocate evaluation tasks across a pool of human reviewers in a way that the questions/answers are marked by markers who are well suited evaluate the particular questions/answers.

Trust scores may also be used to trigger training assignments or peer review requirements to particular markers. Trust scores may be used as mechanism to improve quality of marking over all including by selectively investing in training of markers.

In another aspect, a person may apply to the platform to become a marker, for example by submitting a transcript and reference letters. A marker in one aspect may search the platform for other markers already associated with the platform to vouch for their marking abilities. A minimum trust score may be required before a marker can vouch for another voucher.

In one aspect, the trust score may determine in part the incentives (financial or otherwise) that a particular marker can receive.

In another aspect, gamification strategies may be implemented to the platform (10) to promote desired behaviours in the relevant community administered using the platform (10).

In another related aspect, an administrator may invite markers or facilitators to the platform. Various rules may be set to determine who may invite for example a marker. This may depend for example on the trust score of the person making the invitation. Facilitators may selected in a number of ways. The professor of a course may be a facilitator automatically. In other cases, markers may earn facilitator status over time, for example based on their trust score.

The results of an "intervention evaluation" may impact on trust score. For example, the platform may assign, or a facilitator may assign, multiple evaluations of the same questions to determine consistency. This may be done randomly, or this may be done for example to test the quality of marking of one or more markers. For example, a facilitator may decide that a certain number of questions/answers assigned to a new marker, or a marker with a lower quality score, should also be marked by a marker with a higher quality score. Once the questions/assigns are marked by the plurality of markers, the facilitator may easily navigate to view the various answers/questions subject to an intervention evaluation and view the results. The facilitator may for example trigger a change in one or more of the trust scores. In another possible implementation, the facilitator may send a communication to the markers asking that they reevaluate their marks. Discussions between the different markers may also be facilitated through the platform, in part to encourage learning between the markers. The discussions may be guided by the facilitator in a way that promotes the consideration of different evaluation perspective in a disciplined manner.

In another aspect of the invention, an examination paper may cover different aspects, and some markers who are part of the marker community may have competency (education, or validated marking experience by operation of the present invention) in relation to certain examination sections, but may have less competency for other sections. The platform (10) enables the matching of markers with examination papers on a section by section basis.

In one implementation, the marking manager (22) may present a list of matches based on the platform client's requirements, and an administrative user may selectively view for example (A) background information regarding selected marking candidates, (B) reports regarding performance of selected marking candidates, based on their profile, (C) feedback or ratings concerning markers from other teachers, (D) marker quality scores (established by personnel for a platform client, or obtained from the broader platform assessments), and so on. This information may be used for example to invite particular markers to participate in a marking job, which may require sending communications through the platform.

The marker community manager (20) may also include one or more utilities that enable the education of markers, for example to ensure that markers have specific knowledge that may be required or useful to ensure quality of marking of exams having a particular subject matter. The marker community manager (20) may be linked to, or may include, an online learning platform that delivers learning relevant content in a variety of formats, including for example as text based articles, presentations, or videos. In one implementation, the administrator may for example require that markers consume educational content before exam questions are delivered to them for marking using the marking dashboard (28).

In another aspect of the invention, the marker community manager (20) enables an administrator to access one or more features of the incentive system (46) in order to design a set of incentives in order to motivate desired behaviour in markers, including behaviour that is consistent with the marking quality objectives of the platform client. Examples of incentives are provided under the "Example In Operation" heading below. In one aspect of the invention, the marker community manager (20) enables an administrator to analyze the efficacy of incentives in encouraging the desired behaviour, across different crowd marking jobs for example, using the analysis engine (34). Examples of behaviours that may be desired in markers include for example: accuracy, consistency with marking rules, quality of feedback, timeliness, referring other quality markers and so on.

A skilled reader will appreciate that the incentive system (46) may be configured to include a variety of features, so as to achieve various objectives, in innovative ways. For example the incentive system (46) and other features of the platform may be configured in a way that promotes educational attainment of markers. For example, markers may be automatically assigned tasks by operation of the platform that (A) they are qualified to undertake, but also (B) that help markers achieve their own educational objectives. In addition, the incentives applied using the incentive system (46) may be tied to marker's educational goals. For example, income generated (for example through payments from the operator of the platform in exchange for marking services, or redemption of "points" collected using the incentive system (46)) may be used by markers to fund their education in a number of ways. Markers who are graduate students are quite likely to use income to support their educational goals as they see fit. In addition, the incentive system (46) can be configured to set parameters to how value received by markers through the platform may be applied. For example, markers may be graduate students attending an educational institution whose exams they are marking through the platform. Points collected using the incentive system (46) may be redeemable for example in exchange for a tuition credit. This type of incentive may be very valuable to the marker, and more affordable than cash payment to the educational institution. In another implementation of the invention, the incentive system (46) may be configured in a strategic way for example by allocating credits to particular courses or seminars that, based on knowledge of the marker (which may be accumulated in part by the platform), would be of assistance to the marker in attaining his/her educational objectives. In other words, the intelligent features of the platform may be applied to the treatment of markers as well. This builds further value, and enhances loyalty of markers, which is an important factor as educational institutions may rely heavily on attracting regular markers.

In another aspect of the invention, a certification program may be linked to the platform, whereby before assigning marking activities, or particular marking activities, markers may have to obtain a certification, which may be linked to consuming particular educational content through the platform, or to other factors. Various other requirements may be associated with any such certification requirements.

A skilled reader will appreciate that the platform allows both advancement of human knowledge and promotion of accurate assessment of such advancement.

A skilled reader will also understand that various other incentives may be embodied in the present invention.

The marker community manager (20) is best understood as a series of utilities used to build a community based on crowd marking, and also to manage various aspects of platform activities involving members of the community.

The marking manager (22) may include one or more tools that enable a platform client authorized user to for example view information regarding their markers; using one or more reporting tools various to generate reports regarding the performance of their markers; design incentives for motivating specified behaviour in markets and so on.

Example in Operation

In one aspect of the present invention, the platform (10) implements a series of features and functions that enable the training of the computer system. In a more particular aspect of the present invention, the platform (10) includes one or more processes that enable the capture of aspects of the marking guide (30) in an automated manner. These processes help reduce the work involved in creating marking guides, and also managing markers, and therefore make the computer system, and related computer implemented workflows, more efficient.

In one aspect of the invention:

(A) An administrator (who may be a teacher) signs into a web area associated with a particular platform client. The platform client may be a university who employs the administrator.

(B) The administrator creates an exam marking "job", using the administrative dashboard (24) and may also define one or more settings associated with the marking "job", using the marking guide generator (26).

(C) The administrator, or somebody who has been delegated this task by the administrator, or the platform client, initiates the exam on-boarding processes described above. This results in a set of examination papers being implemented to the platform (10). The set of examination papers are now linked to the marking manager (22).

(D) In one implementation of the invention, a marking job managed by the platform (10) generally includes (i) a "training phase" and a (ii) a "crowd marking phase". The "training phase" describes the use of the platform (10) to mark an initial set from a group of exams so as to capture certain information and/or parameters that support intelligent features used to enable the marking of the rest of the group of exams by a marking community associated with the platform (10) (or a subset thereof), using one or more intelligent features of the present invention described in this disclosure.

In one implementation of the present invention, the number of exams to be marked using the "training phase" and then using the "crowd marking phase" is suggested by the marking manager. The administrator may them use the marking manager (22) to vary the number suggested. The marking manager (22) for example may suggest the number of exams to be marked in these phases (i) based on the numbers used in other marking jobs (whether by the particular platform client or other platform clients), or (ii) based on one or more best practices implemented to the platform (10), for example by configuring the analysis engine (34) which may be used by the marking manager (22) to suggest the numbers to be used by the in the training phases and crowd marking phases.

A skilled reader will understand that the intelligent features of the present invention may be directed to (i) enabling the management of the marking community such that the marking quality associated with the marking community's efforts approximates the marking quality associated with the more skilled, more expensive training group; (ii) monitoring the marking quality associated with the marking community, and automatically identifying particulars that may require escalation (such as re-marking selected questions assigned to one or more markers, or all questions assigned to one or more markers), changing the parameters for defining the job allocations for one or more markers, designating one or more markers for additional training, initiating a change to the profile of one or more markers on the platform (10).

(E) The administrator uses the administrative dashboard to launch the "training phase" that is implemented by the marking manager (22). The training phase, in one aspect of the invention, is used to enable (using a group of trusted markers) to (i) calculate marking expectations (as further explained below) for automated benchmarking and associated quality control processes, and (ii) capture comments from the training group so as to form the basis of available comments (as defined above). The platform (10) is operable to semantically analyze the answers associated with the comments captured during the training phase so as to define automatically a set of answer parameters associated with a particular comment. A skilled reader will understand that this can be accomplished in a number of different ways. A skilled reader will also understand that the answer parameters are used by the analysis engine (34) in the crowd marking phase to (i) analyze semantically particular answers being marked by a crowd marker ("current answer"), (ii) compare the semantic analysis results for the current answer to a table inducting the answer parameters (where the answer parameters are associated with one or more comments), (iii) determine relevant comments based on (ii) for display to the marker using the marking dashboard (28).

(E) In one aspect of the invention, the training group is encouraged to provide comments liberally, and know that their comments will be used for the purposes of generating the marking guide (30) of the present invention.

(F) The administrator may have previously established in the system a "training group" of markers. The training group of markers consists of one or more markers that are considered to be relatively skilled, and may be trusted by the administrator. Alternatively, the training group may be suggested by the platform (10), for example based on the analysis engine (34) analyzing for example a marking community associated with the particular platform client. Further details regarding this aspect, and related aspects, are provided under the heading "Marker community manager".

In one implementation of the present invention, the system logs information that allows the tracking from marking job to marking job of the particular markers that have been used by a platform client, or a particular teacher associated with a platform client. The platform (10) may also log quality score results that for example a particular platform client or particular teacher associated with a platform client has realized using particular crowd markers. An administrator for example may use the administrative dashboard (24) to access one or more reports generated by the analysis engine (34) that enables the review of relative performance of crowd markers. This information may be used by an administrator for example to create particular crowd segments who are suited to mark questions or exams based on a range of different criteria. This allows an administrator for example to access the administrative dashboard (24) in order to use various features of the marker community manager (20) in order to build custom crowd communities that can be leveraged in order to meet particular crowd marking requirements of a platform client for example. For example the administrative dashboard (24) may enable an administrator to view his/her community segments that may have been used for past marking assignments, and also certain notes that the administrator may have stored to the platform (10) summarizing past experience using the particular community segment. The marker community manager (20) may include one or more utilities that implement known features for crowd segmentation. These utilities may be used by the administrator to further refine his/her crowd communities, possibly by finding other markers that meet the administrator's criteria (based for example on attributes associated with the exam (such as the content of the questions, the course that the examination relates to, quality scores achieved by particular markers in marking similar exams for other platform clients and so on).

(G) Actions of the training group in marking exams are logged by the logger (38). The marking manager (22) may implement a number of platform processes for capturing knowledge from the marking activities of the training group. The marking manager (22) may embody a series of rules for enabling extraction of insight from the actions of markers who are part of the training group. In one implementation of the present invention, the marking manager (22) implements one or more processes for aggregating or coalescing comments from multiple markers so as to define and suggest to an administrator a smaller, more manageable set of comments. The administrator can then "confirm" a set of comments to be used by the platform (10) in the crowd marking phase. For example, in one aspect of the invention, the marking manager (22) initiates the iterative logging of the comments to a particular question or sub-question in the database (15), each comment is compared to an existing group of logged comments. "New" comments are stored to system, for review for example by an administrator. Comments that are similar to other logged comments may be discarded automatically, or may be sent to the administrator so that the administrator can select which phrasing of a particular comment is preferred.

(H) A skilled reader will appreciate that training phase streamlines and/or automates certain aspects of the creation of marking guide (30) in part by: (i) streamlining the collection of preferred comments by leveraging the work of the training group in marking a group of exams, (ii) automatically capturing answer parameters for enabling intelligent comment suggestions to crowd markers, and (iii) automatically capturing a set of statistical parameters for supporting quality control processes in relation to activities of crowd markers.

(I) Once the training phase has been completed, the administrator may initiate the crowd marking phase, or the platform (10) may automatically initiate the crowd marking phase upon completion of the training phase. In one implementation of the present invention, upon initiation of the crowd marking phase, the marking manager (22) automatically allocates marking tasks to the relevant crowd marking community associated with the platform (10). The relevant crowd marking may depend on a variety of different parameters, which are discussed in greater detail under the heading "Marker community manager".

In one implementation of the present invention, the marking manager (22) uses the analysis engine (34) to suggest a possible allocation of exam questions and/or sub-questions across the relevant crowd marking community. This allocation may be based on for example on comparing the profiles for the markers who are part of the relevant crowd marking community to the questions or sub-questions for the particular exam, in part by reference to the associated difficulty score (explained above). As mentioned earlier, the platform (10) includes a profile for each crowd marker that is automatically updated based on range of different actions of the marker, or in relation to the marker's work on the platform (10), even by administrators for other platform clients. For example, every time a re-marking is initiated of marking tasks completed by a particular crowd marker, this may result in a reduction of their quality score, or their quality score in a particular domain. A skilled reader will immediately understand that other criteria may be used for allocating particular questions or sub-questions to particular crowd markers.

(J) The marking manager (22) may implement one or more processes related to the management of crowd markers in regards to completion of the various allocated tasks related to a particular job. In one aspect of the invention, the marking manager (22) implements processes related to the completion by markers of allocated tasks. For example, in one implementation of the present invention, the platform (10) includes communication utility (42) that is operable to send notifications to selected markers of their assigned marking tasks. In a particular implementation of the present invention, a calendar utility (44) may be linked to, or made part of the platform (10) of the present invention. The calendar utility (44) may be used by markers to indicate their availability to accept and complete marking tasks. The allocation of tasks amongst a relevant crowd marking community may be based in part by one or more attributes set by the administrator related to the completion of the marking project, and matching these attributes to the availability of selected markers. In another aspect of the present invention, the administrator may use the administrative dashboard (24) to for example require that markers first confirm their availability to complete tasks based on one or more defined parameters. The administrative dashboard may automatically publish job status information, for example current numbers of markers who have confirmed their ability to complete allocated tasks within the defined timing parameters.

Once a marker has accepted their allocated task, the marking manager (22) may implement one or more processes for ensuring that markers complete their accepted tasks. Because all actions of markers are logged by the logger (38), the marking manager (22) may track the completion of allocated tasks by the relevant markers, which may trigger automatic updates to their profiles. For example, if markers fail to complete allocated tasks, then this may be stored to their profile and a "reliability score" may be increased or decreased depending on behaviour. This may alter the outcomes of matching of jobs with particular markers, or may affect the incentives allocated to markers by operation of the platform (10).

(K) In another aspect of the invention, the marking manager (22) monitors the activities of each marker, and integrates into the marking processes a plurality of quality assurance processes.

In one implementation, the marking manager (22) implements one or more quality assurance processes. In one example, the marking manager (22) monitors the marker actions to determine if a particular task has been completed, and it does not appear to have been completed, an alert is provided to the marker. For example, in one implementation, the marking dashboard (28) may highlight the portions where action from the marker was required, and were not taken.

For example, the marking manager may automatically create a flag if for example a comment selected by a marker and an associated score are inconsistent, based on applicable rules. For example, based on the marking guide (30) the comments including "excellent" may be associated with a particular range of marks. If a lower mark is assigned, then this may first be flagged to the marker for verification, and optionally these instances may be logged to the marker's profile and may also be escalated to an administrator, depending on the settings defined by the administrator.

In another possible implementation of the present invention, the marking manager (22) iteratively compares the aggregate crowd marking results and/or the results of each marking of a question of sub-question to statistical expectations defined based on the results of the training phase as described above. Alternatively, one or more machine learning methods may be used to dynamically calculate statistical expectations. A skilled reader will understand that a number of different techniques or processes may be used.

For example, in one implementation if a marking result is detected that falls outside of what the platform (10) expects, for one or more reasons, then the marking dashboard (28) may be triggered to display a message to the relevant marker, for example: "Part 2 marks are higher than expected, please confirm."

Various other features may be implemented to the marking dashboard (28) to aid in the streamlining of completion of tasks. For example, the marking dashboard (28) may display a log of tasks completed thus far; remaining number of tasks to be completed; reminders of deadline for completing tasks; current average time taken to complete a marking task, and so on. A skilled reader will immediately understand that various other workflow management features and functions are possible and may be readily implemented to the platform (10). These may include for example incentive related messages that are displayed in real time and that may be displayed using the marking dashboard (28).

The marking manager (22) may implement one or more processes related to marking quality assurance. For example, the marking manager (22) may implement a series of triggers for one or more escalation procedures. These triggers may be defined in a number of ways including for example selecting a quality assurance template, using the administrative dashboard (24), configuring a set of quality assurance rules using the administrative dashboard (24). For example, if a marker's actions fall outside of statistical expectations more than 3 times, this may trigger an administrator being alerted, and the administrator may have the option of reviewing selected marking tasks, or assigning the tasks for re-marking by a selected marker, or a marker who may be suggested by the platform (10) based on performance within preferred parameters, as detected by the platform (10).

For example, as described in this disclosure, the platform (10) may include or be linked to an incentive system (44). The inventive system (44) may incorporate a variety of incentive mechanisms, including various incentives used in various platforms that incorporate crowd sourced activities. For example, the incentive system (44) may assign badges, points, credits or other incentives. The incentive system (44) may define various rules for trading, assigning or redeeming incentives. In one implementation of the present invention, accumulated incentives or "points" may be traded by a crowd marker toward a reduction in tuition from a platform client organization for example. In another aspect of the invention, the incentive system (44) may include incentives based on gamification. For example, the platform (10) may be configured so that crowd marking activities are conducted based on a social game. For example, crowd markers may compete based on a range of criteria—for example highest quality score, highest number of exam questions marked without initiation of a re-marking; a weighted score based on number of questions marked and relative difficulty, and without any "demerit" points which may be assigned based on failure to complete tasks for example. Various related attributes may be selected using for example the administrative dashboard (24). A skilled reader will appreciate that various other incentives may be applied for the purposes of the platform (10).

(L) The marking manager (22) enables the completion of a job. The administrative dashboard (24) may provide access to interim results and upon completion enables the administrator to access results. The administrative dashboard (24) may also use the analysis engine (34) to access various reports regarding the completion of tasks related to the job, including for example a distribution of markers based on quality score ranges. This information may be used to reconfigured crowd marking community segments, using the marker community manager (20) to improve further results for the next job.

(M) In a further implementation of the present invention, the cumulative results from the training phase and the crowd marking phase may be analyzed by the analysis engine (34) so as to generate parameters for a third phase involving use of machine based marking. This may be applied to selected questions only, while other remaining questions may be marked using a further crowd marking job related to remaining exams. As explained earlier, the marking manager (22) may generate and provide to the administrator suggested distributions of exams across the different phases. In one example, 100,000 exams require marking. The training group may consist of 100 exams. The crowd marking phase may consist of 10,000 exams. The remaining exams may be marked using an automated, machine learning based marking utility (48) that may be linked to the platform (10). The automated marking utility (48) generated results may be monitored by the marking manager (22) and may trigger review of selected results, or selected re-marking of specific results that are not consistent with expected results based on analytical operations of the analysis engine (34).

For greater clarity, automated marking solutions that may apply machine learning algorithms are become more widespread, and their performance is being improved. However, these solutions require training data for operation of the machine learning algorithms, or in order to achieve desirable accuracy characteristics. Another advantage of the present invention, is that the platform and associated methods enable the generation of training methods for example to enable application of machine learning algorithms for correction of the remaining around 90,000 exam papers. This training data may be used by third party platforms or machine learning based marking solution providers. The platform also streamlines human diagnostic studies of the assessments generated by machine learning methods. Alternatively, these features may be incorporated in or integrated with the present platform.

Additional Features

In one aspect of the invention, the marking dashboard (28) may enable markers to provide either their own comments, rather than selecting from the available comments presented by the platform (10). In a particular implementation, this option is only made available to a marker who meets one or more quality marking criteria.

In another aspect, the marking dashboard (28) allows comments or other annotations to be recorded in an overlay that permits the comments or annotations to be made and recorded in any number of locations associated with content to be evaluated such as an answer provided to a particular question. The platform (10) may record the content of the comments and its location as selected by the evaluator/marker.

In another implementation, the marking manager (22) implements the continuous logging of comments, and determines once the logged comments meet one or more predetermined thresholds. For example, the marking manager (22) may determine a default minimum number of comments; the administrator may alter this for certain questions; after the training phase the administrator may review available comments and either "close" questions (after which crowd markers may be required to select one of the available comments and may not have the option to create their own comments, or leave "open" certain other questions, which means that crowd markers (or crowd markers with a defined quality marking score) may still enter comments. These new comments from crowd markers may also be subject to administrator defined evaluation (for example by the administrator or by one or more members of the training group). Once predetermined thresholds are reached then previously "open" questions may also be "closed".

For example in one implementation of the present invention, Marker A may be assigned to mark 50 answers to Question X. When Marker A accesses his marking dashboard (28) to correct answers 1-25 of Question X the marking dashboard (28) may permit Marker A to use a comment established in his own discretion because Question X may not have yet been "closed" because the administrator may not have yet approved this and/or there may not yet be a sufficient number of approved comments associated with different possible answers for the question. By the time Marker A is ready to mark the $26^{th}$ instance of Question X, this question may now have been locked down the platform (10). As a result, the marking dashboard (28) is dynamically updated by the platform (10), and the option for Marker A to insert his comment is no longer presented, instead Marker A is required to select from a set of "canned" comments. This may depend on the content of the answer and/or the score assigned on a preliminary basis by the marker. As a result, the marking dashboard (28) and associated crowd marking functions have adapted to the information logged to the platform (10).

As a further example, the ability to write comments may be reserved for example to markers that meet other criteria. This may include the proximity of the match between the subject matter of a question and the marker's profile, based for example on their educational background, marking quality score, and/or number of comments that they have logged to the system in the domain of the question that have subsequently been accepted as the "canned" comments in the system.

The profile of each marker may be dynamic. For example the marking quality score can increase or decrease, and various aspects of the permissions associated with a particular marker, for particular questions, may be adapted based on these upward or downward changes.

In another aspect of the present invention, the platform (10) may include or link to a social networking platform for enabling a series of social media interactions. For example, users may share marking guides and other materials with selected contacts from other platform clients for example of the platform (10). The platform (10) may also be used as a mechanism to share exam questions. In one implementation of the present invention, the platform (10) includes one or more tools for searching for exam questions (and optionally associated content including marking guides for example) available for sharing. The platform (10) may present links to material regarding the available content, including for example conditions associated with accessing the exam content from third parties, which may include payment of a license fee, exchange of content, and other conditions.

The marking dashboard (28) may present multiple overlays, each overlay being based for example on evaluation for a different purpose. For example a subset of answers may be evaluated not just for the substance of the answer, but also the grammar of the answer. Grammar may be evaluated for example across multiple questions, whereas accuracy of the answers may be evaluated on an answer by answer basis. Evaluators may select for example a "grammar" button that presents an overlay that is associated with an entire page comprising multiple answers, and that permits the evaluator to correct grammar mistakes and provide a grammar score.

The marking dashboard (28) may incorporate analytical features. For example the platform (10) may include various technologies for analyzing information presented by the persons being evaluated. Some answers may be provided in multiple choice form that may be captured digitally. Various other content capture techniques may be used such as OCR. The information captured by the platform (10) may then be analyzed by the platform so as to highlight specific information or suggest possible comments based on such content analysis.

In one implementation of the present invention, the platform (10) may include or link to an authoring tool (54) that enables the authoring of exam questions. The authoring tool (54) may enable a teacher for example to access one or more templates for creating exam content. The authoring tools may also enable for example a teacher to import existing content, which may be used as starting point to create content using the platform (10). In one implementation of the present invention, exam content may be created by operation of the authoring tool (54) that is optimized for use in conjunction with the platform (10) of the present invention. For example, the authoring tool (54) may present a series of screens in conjunction with the creation of exam content that initiate the user (usually a teacher) to (A) tag exam content to support matching operations described in this disclosure, (B) guides the preparation of a marking guide in conjunction preparation of exam questions, (C) automatically retrieves components of a marking guide associated with a similar question, and suggests these components to the user as a shortcut for creation marketing guides, and (D) after uploading an exam onto the platform, exam authors may be asked whether they wish to share their exam question content with other exam authors under a range of different (e.g. Creative Commons) licenses, perhaps after an embargo during which the exam content is not shared. The uploaded and shared exam is taken by exam takers and scores may be assembled using the crowd sourced marking methods outlined in this disclosure. The scoring profile for a shared exam question may be shared enabling future exam authors to know the difficulty score of each exam question in the shared and previously marked exam. The sharing of exam problems may also, in one implementation, be made subject to gamification. For example, examination authors can compete to build the best assessments according to a variety of criteria for example (i) criteria defined and adjudicated by other exam authors in the platform (may be relevant exam authors who have also posted exams written by them in a related domain), (ii) "likes" or equivalent of an exam by other users, or relevant users such as exam authors who have also posted exams written by them in a related domain.

A skilled reader will appreciate that various social media interactions may be utilized in connection with the marking and related educational objectives of the platform discussed herein. One aspect of social interactions is to enable markers to converse with one another through the platform, including for example to discuss certain answers, the subject matter being evaluated, or related topics. These social features may be useful to promote training and to make marking more social and therefore enjoyable and attractive to markers.

In another aspect of the invention, the platform (10) may provide one or more mechanisms for students and their markers to interact with one another. For example, marked papers may be delivered to students by providing them with a link that allows them to access one or more web pages that contain only their information. Alternatively, the platform (10) may include a web area associated with a particular student. The student may be given credential to sign into this web area, where they may access a variety of features such as for example course materials, course planning tools, and other features that may be driven by a learning management system that is connected to the platform (10) or part of the platform (10). The web area may also permit a student to collect their marked exam papers, across several courses for example. When they access their marked exam papers, the associated web pages may provide one or more features that allow the students to ask questions about certain exam questions, including for example marker feedback or other related questions. These questions are captured by the platform (10) and through one or more features of the platform (10) these are passed on to the particular marker (or a facilitator if s/he is not available). Again, the marker may have been selected with particular expertise in a specific domain, and therefore there is value in enabling the student to engage with the particular marker who marked the particular question of interest to the student.

The platform (10) may include various communication or engagement features or utilities that enable online conversations between the student and the marker such as Internet chat or Internet posts Twitter™ and so on.

In another possible implementation, take home assignments may also be administered through the platform. A broadcast communication may be sent through the platform (10) to selected students. Each email may have a unique link that allows the student to access their assignment. Assignments may be filled in a number of ways, including online or by printing out the paper, and importing to the system, as described elsewhere in this disclosure.

In another aspect of the present invention, markers may use various tools providing feedback on answers in addition to scoring. For example, markers may tag answers with particular labels that may for example designate an answer that a marker feels is exemplary and as such is valuable for improving learning outcomes, or operation of the platform. This tool may be used to collect for example a corpus of exemplary answers. Alternatively, a student may provide an answer that is scored low but that reveals a gap in teaching of the subject matter, or the need to improve learning for the student by recommending that the review particular materials or access tutoring in a particular domain.

In another aspect, the corpus of exemplary questions may be used to present model answers to students specifically in relation to answers that they got wrong. This information can be presented for example through their web area.

The incentive system (46) may be used to implement various means for motivating markers linked to the platform (10). For example, the incentive system (46) may be used to link to various third party platforms for example to enable the dissemination and sharing of badges provided to markers by operation of the platform (10). For example, as mentioned earlier, the platform (10) may be associated for example with social media websites created for example by educational institutions for creating engagement with their students and alumni. These websites may be used to create campaigns for promoting loyalty to educational institutions in order to motivate individuals to meet objectives of educational institutions, including participation in crowd marking initiatives. For example, sponsors of educational institutions may provide incentives through social media websites to motivate users to participate in crowd marking initiatives.

In another aspect of the invention, the analysis engine (34) may implement various other analytical operations. These may include one or more algorithms for analyzing the performance of markers. The analysis engine (34) may also implement various statistical tools for assisting in the creation of exams (including the scoring of questions) in accordance with desired scoring distributions. The statistical tools may also be used to support the creating of the marking guide (30) by assisting teachers in designing exam content and/or marking guides (30) that will not produced unexpected or undesired grade distributions.

The analysis engine (34) may also implement mechanisms for calculating the various quality marking scores and/or enhance to assist in the assessment of markers, including for the purposes of matching exams and/or exam questions to markers that will promote the marking objectives. The output of assessments may be updated to their profiles in the platform.

For example, it may emerge that a given marker is very skilled at assessing whether a mathematical calculation is correct but may be less capable at assessing whether a logical argument designed to provide proof of a mathematical statement is correct. Another marker may have the opposing skills profile. This knowledge about markers may emerge over time as they participate in the crowd sourced evaluation of mathematics exams using the platform. Future assignments of marking tasks may be assigned and delivered to particular markers by operation of the platform based on their profile (e.g. a skills and experience profile).

In another representative scenario, some markers may excel at evaluating essay questions based on reading comprehension of a passage while other markers may excel at evaluating creative writing exercises. The crowd sourced marking platform of the present invention can assign particular marking tasks to markers closely aligned with their skills profile.

In one possible aspect of implementation of the present invention, the marking manager (22) may use the analysis engine (34) to detect if a particular marker marks outside of the norm and may automatically calculate and apply an equalizing factor.

The platform (10) may also be used for example to mine data that may be used in pedagogical research. A number of research tools may be developed and deployed to the platform to facilitate pedagogical research.

The platform (10) may also include various additional management features. For example, a management interface presented to a facilitator may show the progress of a marking project. The interface may show the various pages—which have been marked, which have been assigned, which may not have been assigned yet, which are being actively marked so on. These features allow a facilitator to manage marking projects effectively.

In another possible aspect, the analysis engine (32) automatically analyzes the performance of exam takers, and compares their performance to one or more marker profiles associated with a particular knowledge domain, and invites exam takers who match to one or more marker profiles to participate as a marker in the platform.

General

Figure 9:
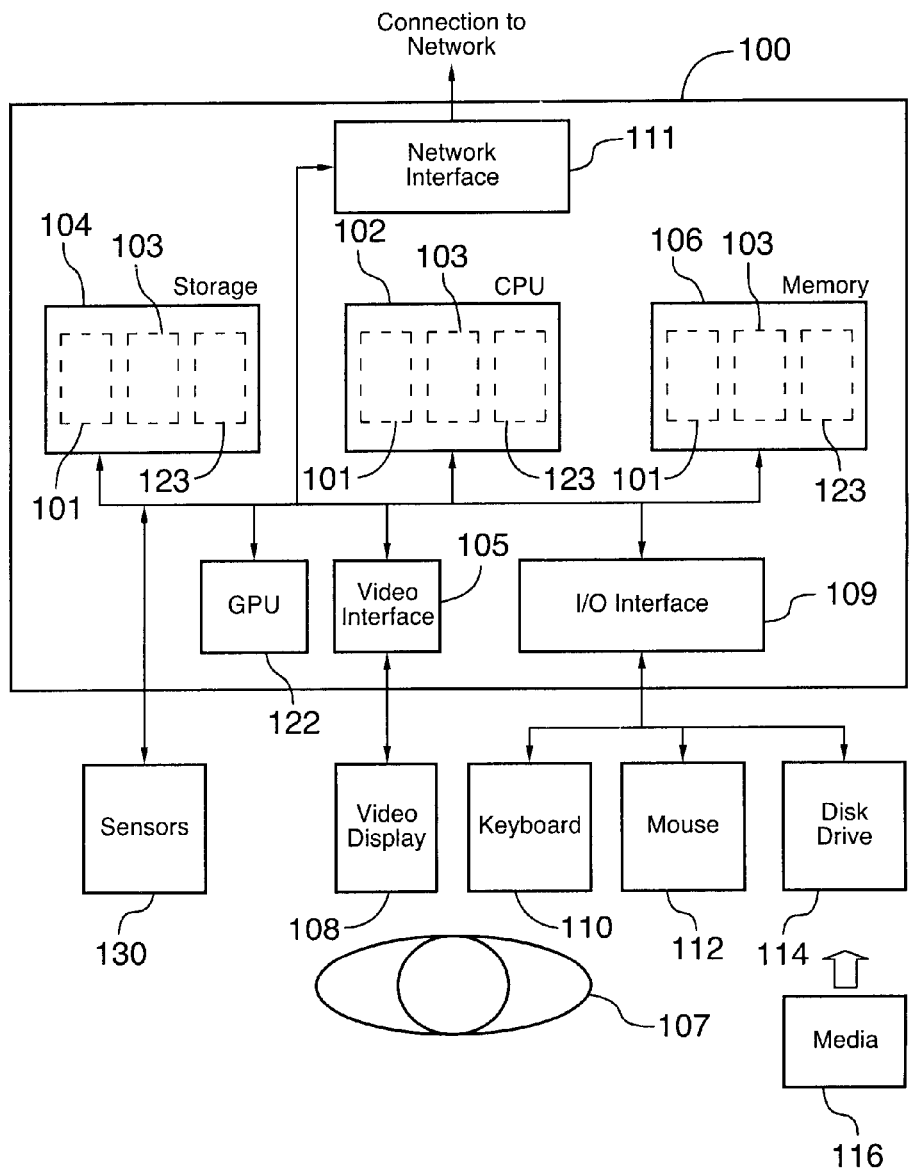
FIG. 9 illustrates a possible generic computer system implementation of the present invention.

The present invention may be practiced in various embodiments. A suitably configured computer device, and associated communications networks, devices, software and firmware may provide a platform for enabling one or more embodiments as described above. By way of example, FIG. 9 shows a generic computer device (100) that may include a central processing unit ("CPU") 102 connected to a storage unit (104) and to a random access memory (106). The CPU (102) may process an operating system (101), application program (103), and data (123). The operating system (101), application program (103), and data (123) may be stored in storage unit (104) and loaded into memory (106), as may be required. Computer device (100) may further include a graphics processing unit (GPU) (122) which is operatively connected to CPU (102) and to memory (106) to offload intensive image processing calculations from CPU (102) and run these calculations in parallel with CPU (102). An operator (107) may interact with the computer device (100) using a video display (108) connected by a video interface (105), and various input/output devices such as a keyboard (110), mouse (112), and disk drive or solid state drive (114) connected by an I/O interface (109). In known manner, the mouse (112) may be configured to control movement of a cursor in the video display 108, and to operate various graphical user interface (GUI) controls appearing in the video display (108) with a mouse button. The disk drive or solid state drive (114) may be configured to accept computer readable media (116). The computer device (100) may form part of a network via a network interface (111), allowing the computer device (100) to communicate with other suitably configured data processing systems (not shown). One or more different types of sensors (130) may be used to receive input from various sources.

The present invention may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

While the above description provides examples of one or more embodiments of the invention, it will be appreciated that numerous other embodiments may be within the scope of the present invention, as defined by the following claims.

It will also be appreciated that the block configurations, screen shots, and flow charts provided herein are for illustrative purposes only and various modifications thereof are applicable within the principles discussed herein.

Although the above principles have been described with reference to certain specific embodiments, various modifications thereof will be apparent to those skilled in the art without departing from the scope of the invention and the claims appended hereto. Other modifications are therefore possible.

Various advantages of the present invention have already been mentioned above. Some additional advantages are described below.

The present invention provides:

A unique and innovative Internet platform for enabling marking of exams including based on crowd sourced features.

An Internet platform that enables management of crowd marking in a new and innovative way.

An Internet platform the streamlines the collection of exam marking data sets to feed automated computer-based marking.

An Internet platform that reduces the cost of marking exams, and increases the speed of exam marking.

A crowd marking platform that includes a series of intelligent features that provide exam integrity and quality of feedback that matches or approximates that provided using more expensive, and cumbersome manual processes.

An exam authoring tool, and marking guide authoring tool that is easy to use and integrates social media functions.

An Internet platform that saves valuable time of teachers and instructors.

The platform presents opportunities to improve quality of marking for example by setting exams centrally and then randomizing marking so that inconsistencies in scoring may be normalized. Furthermore randomization can promote specialization and therefore improvements in quality.

The invention claimed is:

1. A computer network implemented system for performing crowd sourced examination marking, the system comprising:
   one or more servers linked to the Internet and to a database, the one or more servers enabling one or more computer-implemented utilities providing:
   a marker community manager that enables authorized users of the system to access one or more features or functions for building and managing a plurality of markers associated with the system, and a profile manager for managing a plurality of marker profiles for each of the plurality of markers, and storing the plurality of marker profiles into the database;
   an examination content distributor for making accessible examination content to the plurality of markers using one or more network-connected devices, the content distributor enabling importing of scanned versions of paper based examination papers into the database such that the imported scanned versions are associated with an examination writer, and wherein an identity of the examination writer is withheld from the plurality of markers; and
   a marking manager that is configured to enable the authorized users to (i) create one or more active crowd sourced marking projects, and (ii) to automate the management of one or more workflows related to completion of one or more aspects of active crowd sourced marking projects;
   wherein the authorized users generate one or more marking parameters associated with marking projects or associated marking activities, where the marking parameters relating to marking quality criteria, and the marking parameters are stored to the database as a marking profile;
   a matching component for matching marking projects or marking activities to the plurality of markers, using the plurality of marker profiles, wherein the matching component:
   recommends markers from the plurality of markers for one or more of the marking projects,
   recommends allocation of a first marking activity to a first set of selected markers from the plurality of markers, and
   delivers examination content for marking including scoring and/or providing feedback on examination content by the first set of selected markers;
   wherein the identity of the examination writer in the imported scanned versions is represented with an indicia, wherein the indicia is a QR code,
   wherein each marker profile includes a trust rating based on at least one of competence and/or experience of the marker, wherein the one or more active crowd sourced marking projects includes a training portion comprising receiving a set of scored answers and feedback for the scored answers from the first set of selected markers, wherein each marker in the first set of selected markers has a trust score above a threshold, wherein the one or more active crowd sourced marking projects includes a crowd marking portion comprising distributing the examination content for marking to a second set of selected markers, wherein at least one of the markers in the second set of selected markers has a trust score below the threshold, and receiving a set of scored answers and feedback for the scored answers from the second set of selected markers.

2. The system of claim 1, further comprising a training utility for training the markers for marking exams in one or more specified domains or for open marking projects on an on demand basis.

3. The system of claim 1, the marking manager being configured to:
   (a) suggest a group of test markers from the plurality of markers, or enable the authorized users to define a group of test markers from the plurality of markers;
   (b) initiate the examination content distributor to deliver examination content to the group of test markers for marking of the examination content by the test markers;
   (c) track and analyze actions and/or feedback of the group of test markers so as to generate automatically one or more marking quality criteria;
   (d) wherein the marking quality criteria are used by the marking manager to monitor and/or assess the performance of the test markers.

4. The system of claim 3, wherein the marking manager further enables one or more automated processes for acting on the actions and/or feedback of the group of test markers based on monitoring/assessment of performance of the group of test markers based on the marking quality criteria.

5. The system of claim 1, further comprising an integrated examination authoring tool that includes a marking guide creator, wherein the marking guide creator allows the authorized users including teachers to define a set of parameters and/or information objects associated with marking an examination in a way that meets pedagogical and accuracy objectives, as determined by the authorized user of the marking guide creator, wherein the parameters and/or information objects are collected by the system and stored to an applicable marking profile.

6. The system of claim 3, further comprising an adaptive marking tool that is linked to the workflow manager and to the examination content distributor, and is configured to:
   (a) deliver to the plurality of markers selected examination content based on their assigned marking projects or marking activities; and
   (b) guide the plurality of markers in marking the selected examination content in a manner that is consistent with the marking profile by integrating with the selected examination content one or more marking options and/or examination marking guidance messages based on the marking profile.

7. The system of claim 6, wherein the system automatically links marking input of the plurality of markers and associates the marking input with a file for a particular exam stored to the database, and enables aggregation of marking scores and feedback from the plurality of markers so as to produce a corrected examination for delivery to a person that took the particular exam.

8. The system of claim 3, the utilities including a content analyzer that is configured to analyze the examination content, and to access the marking profile for one or more suggested scoring instructions and/or feedback options, and based on the analysis of the examination content by the content analyzer, filtering the suggested options so as to suggest to the plurality of markers a smaller set of scoring instructions and/or feedback options for selection by the plurality of markers.

9. The system of claim 1, wherein the system is adapted to provide training data for one or more automated examination marking utilities or processes based on machine learning methods.

10. The system of claim 1 wherein the system enables the authorized users to:

(a) define or design an examination;
(b) define particulars for a set of examination writers;
(c) initiate the generation of a set of examinations comprising a plurality of examination questions or pages, each examination question or page being associated with a unique identifier, and each examination question or page being associated with a particular examination writer;
(d) initiate the distribution of the examinations to the examination writers for completion; and
(e) import completed examinations to the system, and allocating the examination questions or pages to the plurality of markers such that the identity of the examination writers remains anonymous.

11. The system of claim 1, wherein the system presents a marking dashboard for enabling the plurality of markers to:
(a) navigate between questions/answers allocated to a particular marker of the plurality of markers;
(b) score answers; and
(c) provide feedback for answers.

12. The system of claim 11, wherein the system enables a crowd community manager to initiate marking of specific questions by multiple markers of the plurality of markers in order to generate comparative marking data.

13. The system of claim 12, wherein the comparative marking data and one or more other data sets relevant to marking quality are used to generate a marker trust score for one or more of the plurality of markers, and wherein the system iteratively updates the trust scores, and automates the allocation of marking tasks based in part on the trust scores.

14. The system of claim 10, wherein the system enables the plurality of markers to make comments regarding examination answers, and examination writers to ask questions regarding examination answers, which questions are transmitted by the system for response from a particular marker that marked the particular examination answers.

15. The system of claim 10, wherein the system automatically analyzes the performance of examination writers, and compares their performance to one or more marker profiles associated with a particular knowledge domain, and invites examination takers who match to one or more marker profiles to participate as a marker in the platform.

16. The system of claim 1, wherein receiving the feedback for the scored answers from the second set of selected markers comprises receiving feedback selected from the feedback for the scored answers from the first set of selected markers.

17. The system of claim 1, wherein recommending the allocation of a first marking activity to a first set of selected markers further comprises recommending the allocation of a second marking activity to a second set of selected markers, wherein the first set of selected markers has a higher trust rating for the first marking activity than the second set of selected markers, and wherein the second set of selected markers has a higher trust rating for the second marking activity than the first set of selected markers.

* * * * *